United States Patent
Djukic et al.

(10) Patent No.: US 10,623,277 B2
(45) Date of Patent: Apr. 14, 2020

(54) NETWORK SERVICE PRICING AND RESOURCE MANAGEMENT IN A SOFTWARE DEFINED NETWORKING ENVIRONMENT

(71) Applicant: Ciena Corporation, Hanover, MD (US)

(72) Inventors: Petar Djukic, Ottawa (CA); Todd Morris, Stittsville (CA); Romualdas Armolavicius, Stittsville (CA); Mitchell Howard Auster, East Windsor, NJ (US); Christopher Frank Janz, Dunrobin (CA); David Côté, Gatineau (CA)

(73) Assignee: Ciena Corporation, Hanover, MD (US)

( * ) Notice: Subject to any disclaimer, the term of this patent is extended or adjusted under 35 U.S.C. 154(b) by 282 days.

(21) Appl. No.: 15/810,345

(22) Filed: Nov. 13, 2017

(65) Prior Publication Data

US 2018/0102948 A1 Apr. 12, 2018

Related U.S. Application Data

(63) Continuation of application No. 14/728,176, filed on Jun. 2, 2015, now Pat. No. 9,838,271.

(Continued)

(51) Int. Cl.
*G06F 15/16* (2006.01)
*H04L 12/24* (2006.01)
(Continued)

(52) U.S. Cl.
CPC ...... *H04L 41/5006* (2013.01); *H04L 12/1492* (2013.01); *H04L 41/0893* (2013.01);
(Continued)

(58) Field of Classification Search
CPC .... H04M 15/8016; H04M 15/66; H04L 12/14
See application file for complete search history.

(56) References Cited

U.S. PATENT DOCUMENTS

| 6,965,867 B1 * | 11/2005 | Jameson ............... G06Q 10/06 705/7.12 |
| 7,343,337 B1 | 3/2008 | Cieliebak et al. |

(Continued)

FOREIGN PATENT DOCUMENTS

CN 103929379 A 7/2014

OTHER PUBLICATIONS

Smith et al., "Yield Management at American Airlines," The Institute of Management Sciences, Interfaces 22, Jan.-Feb. 1992, pp. 1-24.

(Continued)

*Primary Examiner* — Hieu T Hoang
(74) *Attorney, Agent, or Firm* — Clement Bernard Walker Law; Christopher L. Bernard; Lawrence A. Baratta, Jr.

(57) ABSTRACT

Systems and methods for instantiating a network service in a network include receiving a service request for a network service; determining network resources in the network to instantiate the network service; determining a price for the network resources utilizing forecasts with adjustments to the price based on a current network status; providing the price in response to the service request; and responsive to acceptance of the price, causing instantiation of the network service through the network resources in the network.

17 Claims, 22 Drawing Sheets

Related U.S. Application Data

(60) Provisional application No. 62/158,046, filed on May 7, 2015.

(51) Int. Cl.
*H04L 12/14* (2006.01)
*H04L 12/715* (2013.01)
*H04M 15/00* (2006.01)
*H04L 12/26* (2006.01)

(52) U.S. Cl.
CPC ...... *H04L 41/5045* (2013.01); *H04L 41/5051* (2013.01); *H04L 12/14* (2013.01); *H04L 41/5096* (2013.01); *H04L 43/08* (2013.01); *H04L 45/64* (2013.01); *H04M 15/66* (2013.01); *H04M 15/8016* (2013.01)

(56) References Cited

U.S. PATENT DOCUMENTS

| | | | |
|---|---|---|---|
| 7,948,968 B2 | 5/2011 | Voit et al. | |
| 8,306,851 B2 | 11/2012 | Wells et al. | |
| 8,477,679 B2 | 7/2013 | Sharifian et al. | |
| 8,489,720 B1 | 7/2013 | Morford et al. | |
| 10,318,896 B1* | 6/2019 | Sarkar | G06Q 10/0631 |
| 2002/0198749 A1 | 12/2002 | Tomlin et al. | |
| 2006/0285490 A1* | 12/2006 | Kadaba | H04L 47/10 370/230 |
| 2009/0178050 A1* | 7/2009 | Bichler | G06F 9/5011 718/104 |
| 2010/0195540 A1 | 8/2010 | Kerr et al. | |
| 2010/0241492 A1 | 9/2010 | Eglen et al. | |
| 2012/0016721 A1* | 1/2012 | Weinman | G06Q 10/06 705/7.35 |
| 2012/0303416 A1 | 11/2012 | Garmon et al. | |
| 2013/0039187 A1 | 2/2013 | Strulo et al. | |
| 2013/0250770 A1 | 9/2013 | Zou et al. | |
| 2014/0149321 A1 | 5/2014 | Laumanns et al. | |
| 2014/0200947 A1 | 7/2014 | Gujar et al. | |
| 2014/0229210 A1 | 8/2014 | Sharifian et al. | |
| 2014/0328183 A1 | 11/2014 | Au et al. | |
| 2015/0124625 A1 | 5/2015 | Aldrin et al. | |
| 2015/0287078 A1* | 10/2015 | Kolen | G06Q 30/0254 705/14.52 |
| 2016/0063411 A1 | 3/2016 | Ravichandran et al. | |
| 2016/0182297 A1 | 6/2016 | Dauneria et al. | |

OTHER PUBLICATIONS

Gallego et al., "A Multiproduct Dynamic Pricing Problem and Its Applications to Network Yield Management," Operations Research, vol. 45, No. 1, Jan.-Feb. 1997, pp. 24-41.

Bertsimas et al., "Revenue Management in a Dynamic Network Environment," Transportation Science, vol. 37, No. 3, Aug. 2003, pp. 257-277.

Ash, "Max Allocation with Reservation Bandwidth Constraints Model for Diffserv-aware MPLS Traffic Engineering & Performance Comparisons," Network Working Group, Jun. 2005, pp. 1-22.

Le Faucheur, "Russian Dolls Bandwidth Constraints Model for Diffserv-aware MPLS Traffic Engineering," Network Working Group, Jun. 2005, pp. 1-13.

Lai, "Bandwidth Constraints Models for Differentiated Services (Diffserv)-aware MPLS Traffic Engineering: Performance Evaluation," Network Working Group, Jun. 2005, pp. 1-34.

Talluri et al., "Revenue Management: Models and Methods," IEEE, Proceedings of the 2008 Winter Simulation Conference, pp. 145-156.

\* cited by examiner

NETWORK SERVICE PRICING AND RESOURCE MANAGEMENT IN A SOFTWARE DEFINED NETWORKING ENVIRONMENT

CROSS-REFERENCE TO RELATED APPLICATIONS

The present patent/patent application is a continuation of U.S. patent application Ser. No. 14/728,176, filed Jun. 2, 2015, and entitled "NETWORK SERVICE PRICING AND RESOURCE MANAGEMENT IN A SOFTWARE DEFINED NETWORKING ENVIRONMENT," which claims priority to U.S. Provisional Patent No. 62/158,046 filed on May 7, 2015 entitled "NETWORK SERVICE PRICING AND RESOURCE MANAGEMENT," the contents of each is incorporated by reference herein.

FIELD OF THE DISCLOSURE

The present disclosure relates to pricing systems and methods in networks, namely systems and methods for network service pricing and resource management in a Software Defined Networking (SDN) environment.

BACKGROUND OF THE DISCLOSURE

Network operators provide end users network services for connectivity. The network services (which can also be interchangeably referred to as network resources) can include, without limitation, wavelengths or portions thereof, Time Division Multiplexing (TDM) services (such as Optical Transport Network (OTN) or the like), packet services (such as Ethernet, Multiprotocol Label Switching (MPLS), Internet Protocol (IP), and the like), and combinations thereof. The network services are provided based on a network operator's network infrastructure that of course is a finite resource. This leads to the problem of how the network operator properly prices the network services to maximize opportunity using on-demand forecasts. Pricing systems and methods are known in other industries such as with airlines or hotels. However, airline pricing is for networked resources (i.e., there can be many different routes to a same destination) without variable durations (i.e., a seat on a flight is sold for an entire flight). Hotel pricing, while having variable durations is for independent resources. Network services are an example of networked resources for services with non-uniform durations, and existing techniques in the airline or hotel industries do not operate effectively for network services.

Concurrently, Software Defined Networking (SDN), Network Functions Virtualization (NFV), and the like offer an opportunity to improve current network management practices such as with network service pricing and resource management. SDN provides an architecture that is dynamic, manageable, cost-effective, and adaptable, making it ideal for the high-bandwidth, dynamic nature of applications. This architecture decouples the network control and forwarding functions enabling the network control to become directly programmable and the underlying infrastructure to be abstracted for applications and network services. NFV is a network architecture concept that proposes using Information Technology (IT) virtualization related technologies to virtualize entire classes of network node functions into building blocks that may be connected, or chained, to create communication services. A Virtualized Network Function (VNF) can include one or more virtual machines running different software and processes, on top of industry standard high volume servers, switches, and storage, or even cloud computing infrastructure, instead of having custom hardware appliances for each network function.

BRIEF SUMMARY OF THE DISCLOSURE

In an embodiment, a method for instantiating a network service in a network includes receiving a service request for a network service; determining network resources in the network to instantiate the network service; determining a price for the network resources utilizing forecasts with adjustments to the price based on a current network status; providing the price in response to the service request; and, responsive to acceptance of the price, causing instantiation of the network service through the network resources in the network. The price can be determined based on an approximated opportunity cost of the network service, and wherein the approximated opportunity cost can be determined using a plurality of price categories with usage limits for each network resource and finding a feasible path in a lowest price category with available resources. The adjustments to the price based on a current network status can include adjusting the lowest price category based on changes to the forecasts. The price can be further adjusted based on price elasticity obtained from previous responses from an associated user. The method can further include, responsive to rejection of the price, receiving a price proposal; and, responsive to acceptance of the price proposal, causing the instantiation of the network service through the network resources in the network. The network service can be one of a point-to-point, point-to-multipoint, multipoint-to-multipoint connection, and Virtual Private Network, which has an associated Service Level Agreement (SLA) committing the network to support a Quality-of-Service (QoS). The network resources can be one or more of link bandwidth at Layer 0, 1, 2, and/or 3, network element ports, wavelengths, wireless spectrum, compute and storage resources, and Virtual Network Functions (VNF) resources. The service request can be received through one of a service portal, a Customer Relationship Management (CRM) system, and an Application Programming Interface (API), and wherein the method can be performed by a pricing and resource management engine executed on a server communicatively coupled to the network.

In another embodiment, a system configured to instantiate a network service in a network includes a network interface communicatively coupled to a network configured to provide the network service; a processor communicatively coupled to the network interface; and memory storing instructions that, when executed, causes the processor to receive a service request for a network service, determine network resources in the network to instantiate the network service, determine a price for the network resources utilizing forecasts with adjustments to the price based on a current network status, provide the price in response to the service request, and, responsive to acceptance of the price, cause instantiation of the network service through the network resources in the network. The price can be determined based on an approximated opportunity cost of the network service, and wherein the approximated opportunity cost can be determined using a plurality of price categories with usage limits for each network resource and finding a feasible path in a lowest price category with available resources. The adjustments to the price based on a current network status can include adjusting the lowest price category based on changes to the forecasts. The price can be further adjusted based on price elasticity obtained from previous responses from an associated user. The memory storing instructions that, when executed, can further cause the processor to, responsive to rejection of the price, receive a price proposal, and, responsive to acceptance of the price proposal, cause the instantiation of the network service through the network resources in the network. The network service can be one of a point-to-point, point-to-multipoint, multipoint-to-multipoint connection, and Virtual Private Network, which has an associated Service Level Agreement (SLA) committing the SDN network to support a Quality-of-Service (QoS). The network resources can be one or more of link bandwidth at Layer 0, 1, 2, and/or 3, network element ports, wavelengths, wireless spectrum, compute and storage resources, and Virtual Network Functions (VNF) resources. The service request can be received through one of a service portal, a Customer Relationship Management (CRM) system, and an Application Programming Interface (API), and wherein the method can be performed by a pricing and resource management engine executed on a server communicatively coupled to the network.

In a further embodiment, a non-transitory computer-readable medium comprising instructions for a Software Defined Networking (SDN) application that, when executed, cause a processor to perform the steps of receiving a service request for a network service; determining network resources in the network to instantiate the network service; determining a price for the network resources utilizing forecasts with adjustments to the price based on a current network status; providing the price in response to the service request; and, responsive to acceptance of the price, causing instantiation of the network service through the network resources in the network. The price can be determined based on an approximated opportunity cost of the network service, and wherein the approximated opportunity cost an be determined using a plurality of price categories with usage limits for each network resource and finding a feasible path in a lowest price category with available resources. The price can be further adjusted based on price elasticity obtained from previous responses from an associated user. The steps can further include, responsive to rejection of the price, receiving a price proposal; and, responsive to acceptance of the price proposal, causing the instantiation of the network service through the network resources in the network.

In an embodiment, a method is described for network service pricing and service resource management, wherein the method is implemented by a server communicatively coupled to a Software Defined Networking (SDN) network configured to provide the network service. The method includes receiving a service request for a network service in the SDN network; determining one or more price categories and one or more network resources for the service request, wherein the network resources are selected to instantiate the network service; adjusting a price of the network resources by adjusting the price within a range of the price categories based on current and future network information of the SDN network; and, responsive to acceptance of the price, instantiating the network service through the network resources in the SDN network. The network service can be one of a point-to-point, point-to-multipoint, multipoint-to-multipoint connection, and Virtual Private Network, which has an associated Service Level Agreement (SLA) committing the SDN network to support a Quality-of-Service (QoS). The network resources can be one or more of link bandwidth at Layer 0, 1, 2, and/or 3, network element ports, wavelengths, wireless spectrum, compute and storage resources, and Virtual Network Functions (VNF) resources, and wherein one of more of the network resources are time shared via a scheduler.

The method can further include adjusting the price of the network resources based on customer-specific information related to a customer's willingness to pay for the network service using a price elasticity curve. The method can further include, responsive to acceptance of the price, updating the one or more price categories and availability of the network resources. The determining one or more price categories and one or more network resources can include determining an initial price category of the price categories; pruning insufficient resources in the initial price category to determine a first pruned topology; and determining a path through the SDN network on the first pruned topology. The method can further include, if no path is determined on the pruned topology, selecting another price category; pruning insufficient resources in the another price category to determine a second pruned topology; and determining a path through the SDN network on the second pruned topology. The determining one or more price categories and one or more network resources can include determining the price categories with an SDN business application providing a pricing and resource management engine and a path through the SDN network is determined by a Path Computation Element (PCE). The service request can be received through a service portal, a Customer Relationship Management (CRM) system, or an Application Programming Interface (API), and wherein the receiving, the determining, the adjusting, and the instantiating can be performed by a pricing and resource management engine executed on a server communicatively coupled to the SDN network.

In another embodiment, an apparatus is described configured to provide network service pricing and service resource management for a Software Defined Networking (SDN) network. The apparatus includes a network interface communicatively coupled to a network configured to provide the network service; a processor communicatively coupled to the network interface; and memory storing instructions that, when executed, causes the processor to receive a service request for a network service in the SDN network, determine one or more price categories and one or more price network resources for the service request, wherein the network resources are selected to instantiate the network service, adjust a price of the network resources by adjusting the price within a range of the price categories based on current and future network information of the SDN network, and, responsive to acceptance of the price, cause instantiation of the network service through the network resources in the SDN network. The network service can be one of a point-to-point, point-to-multipoint, multipoint-to-multipoint connection, and Virtual Private Network, which has an associated Service Level Agreement (SLA) committing the SDN network to support a Quality-of-Service (QoS). The network resources can be one or more of link bandwidth at Layer 0, 1, 2, and/or 3, network element ports, wavelengths, wireless spectrum, compute and storage resources, and Virtual Network Functions (VNF) resources, and wherein one of more of the network resources are time shared via a scheduler.

The memory storing instructions that, when executed, can further cause the processor to adjust the price of the network resources based on customer-specific information related to a customer's willingness to pay for the network service using a price elasticity curve. The memory storing instructions that, when executed, can further cause the processor to, responsive to acceptance of the price, update the one or more price categories and availability of the network resources. The memory storing instructions that, when executed, can further cause the processor to determine an initial price category; prune insufficient resources in the initial price category to determine a first pruned topology; and determine a path through the SDN network on the first pruned topology. The memory storing instructions that, when executed, can further cause the processor to, if no path is determined on the pruned topology, select another price category; prune insufficient resources in the another price category to determine a second pruned topology; and determine a path through the SDN network on the second pruned topology. The apparatus can be configured to execute an SDN business application providing a pricing and resource management engine and to determine a path through the SDN network by a Path Computation Element (PCE). The service request can be received through a service portal, a Customer Relationship Management (CRM) system, or an Application Programming Interface (API), and wherein the apparatus can be configured to execute an SDN business application providing a pricing and resource management engine.

In a further embodiment, a Software Defined Networking (SDN) network with network service pricing and service resource management includes one or more network elements each including either a physical node or a Virtual Network Function (VNF) executed by a processor; an SDN controller communicatively coupled to one or more of the one or more network elements; and a server configured to execute an SDN application, the server is communicatively coupled to the SDN controller, and the SDN application is configured to receive a service request for a network service in the SDN network, determine one or more price categories and one or more network resources for the service request, wherein the network resources are selected to instantiate the network service, adjust a price of the network resources by adjusting the price within a range of the price categories based on current and future network information of the SDN network, and responsive to acceptance of the price, cause instantiation of the network service through the network resources in the SDN network. The network service can be one of a point-to-point, point-to-multipoint, multipoint-to-multipoint connection, and Virtual Private Network, which has an associated Service Level Agreement (SLA) committing the SDN network to support a Quality-of-Service (QoS); and wherein the network resources can be one or more of link bandwidth at Layer 0, 1, 2, and/or 3, network element ports, wavelengths, wireless spectrum, compute and storage resources, and Virtual Network Functions (VNF) resources.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 illustrates non-differential product pricing and FIG. 3 illustrates differential product pricing;

FIG. 4 is a graph of selling probability versus number sold and FIG. 5 is a graph of expected marginal revenue versus number sold;

DETAILED DESCRIPTION OF THE DISCLOSURE

Figure 1:
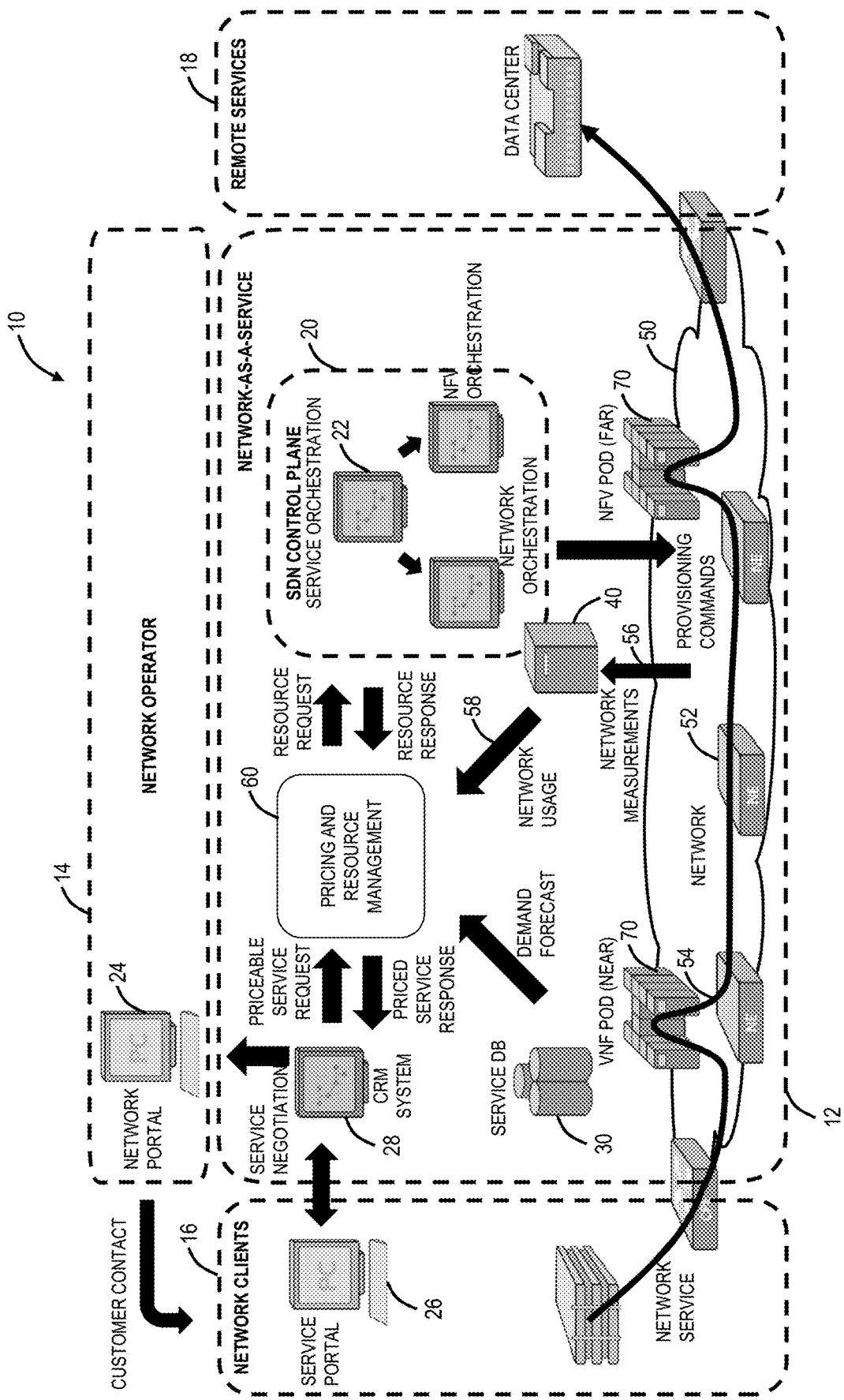
FIG. 1 is a network diagram of an SDN network.

In various embodiments, systems and methods are described for network service pricing and resource management. The systems and methods relate to on-demand Ethernet, Layer 0/1 (L0/L1) optical transport network (OTN), or packet-optical network, with or without SDN control. In particular, the systems and methods price network services. A network service is defined as a point-to-point, point-to-multipoint, or multipoint-to-multipoint connection or Virtual Private Network, which has an associated Service Level Agreement (SLA) committing the network to support a Quality-of-Service (QoS). An SLA is defined with one or more guarantees or limits on availability (connection uptime), bandwidth, packet loss, latency, and/or jitter. SLAs may have a time component, where the QoS commitments may be different at different times, for example, guaranteed bandwidth may change over time. Some parts of the SLA may require the data plane to use Virtual Network Functions (VNFs).

In an embodiment, a pricing and resource management method is described, such as implemented in a server communicatively coupled to a network. In another embodiment, a server is described configured to perform pricing and resource management for a network and its services. The server can be an SDN controller, SDN application, etc. The pricing and resource management method can include determining price category and network resources for a price request for a service, determining a path in the network for the service, adjusting price based on current and known future network information, and adjusting the price based on customer-specific information.

In a network with a wide mix of network services, there is a range of prices that should be charged corresponding to the benefits of each network service and customer's willingness to pay. A wide range of prices means that a network resource may be committed at different price levels depending on which service is assigned to use it. Experience in the airline, hotel, and rental car industries indicates that if prices are not taken into consideration during the assignment of resources, the owner of the resources is bound to lose revenue in opportunity costs. The opportunity cost of a service is the revenue that would be collected if the resources used by the service are assigned to another (higher paying) service. In general, revenue management techniques can be used to ensure that network resources are assigned as much as possible to higher value services. However, due to the peculiarities of how network services are offered, none of the existing revenue management techniques can be applied directly to networking. This disclosure addresses the lack of revenue management methods for network services.

In the context of pricing of network services, the systems and methods prevent a lower paying service from using resources that may be sold to a higher paying service arriving at a later time. The pricing of network services and management of network resources is based on this principle (e.g., implemented in pricing and resource management engine 60 in FIG. 1). The systems and methods use a forecast of demands along with current and known future network usage levels to determine, for each arriving service request, the price at which the service should be charged to maximize the network's aggregate revenue. Maximizing network's aggregate revenue can be accomplished by determining the price corresponding to the opportunity cost of the service, or an approximation of the opportunity cost, using a forecast of network demands and then adjusting the price upwards based on known network occupancy and customers' willingness to pay for the service.

Finding the exact opportunity cost requires perfect knowledge of future service request arrivals and is too computationally costly to implement in practice. Several approximations can be invoked to make real-time network service pricing possible. The first approximation is how opportunity cost is determined. Price categories are used and assigned usage limits for each price category, for each resource in the network. For example, a price category may be assigned the highest percentage of link bandwidth that it may use, or the highest number of optical channels (the amount of spectrum) it may use in a fiber span. The price category limits are set using a forecast of demands and the knowledge of scheduled future services, to maximize the expected aggregate network revenue. Finding the opportunity cost for a service is approximated by finding a feasible path in the lowest price category with available resources. The second approximation is to map all possible services into a much smaller number of price categories before the price category limits are computed. This approximation helps with partitioning of the resources into reasonably sized price category buckets and decreases the amount of computation required to determine the sizes of each bucket.

A key benefit of SDN is that it makes networks agile. That is, decoupling control and data planes enables building of cheaper, commodity, network elements. SDN decouples control and data planes and centralizes management decisions, which allows for the more efficient use of resources, and centralized resource management also enables network agility without the loss of network efficiency. However, SDN also enables deeper understanding of network dynamics and customer behavior. The centralized nature of the management plane enables a deeper understanding of network dynamics since it requires centralized, global, view of the network. The global view of the network also allows a deeper understanding of what the network clients may need to run their traffic more efficiently or with a better quality-of-service (QoS) or quality-of-experience (QoE). QoS can be defined with objective measures such as latency, jitter, packet loss, effective bandwidth, and availability. QoE is defined in terms of user value with suitableness, flexibility, mobility, security, cost, personalization and choice. Note that for one level of QoS a customer may be willing to pay more for the same service, if it has a higher QoE. SDN provides a platform through which the end customer may customize their network access. Since the network management is centralized and can be customized more easily than with current approaches, each customer can have individualized network services. SDN also enables deployment of VNF software appliances in the network, which allows each customer to customize protocols in the data plane. Additionally, the insight into client behavior may provide a way to increase the revenue from the network. SDN allows the network operator to understand how and where clients use the network. SDN allows the network operator to understand how much customers are willing to pay to use the network. From the network point of view, it is necessary to determine how much to charge customers to use the network so that revenue from existing equipment is maximized.

Network Operating Environment

Referring to FIG. 1, in an embodiment, a network diagram illustrates an SDN network 10. In an embodiment, the systems and methods described herein contemplate using the SDN network 10 to price network services. Those of ordinary skill in the art will appreciate the SDN network 10 is presented for illustration purposes and the systems and methods described herein contemplate other implementations as well. The SDN network 10 includes four logical groupings—a network-as-a-service (NaaS) 12, a network operator 14, network clients 16, and remote services 18. The network-as-a-service 12 includes an SDN control plane 20 that communicates with various applications 22 for implementing the systems and methods described herein. Note, the SDN control plane 20 may also be referred to as an SDN management plane. The network operator 14 can include a network portal 24, the network clients 16 can include a service portal 26, and the network-as-a-service 12 can include a Customer Relationship Management (CRM) system 28 and a service database 30. Network analytics for the SDN control plane 20 is configured to operate on one or more servers 40 or other processing devices.

The network-as-a-service 12 includes a network 50 formed by a plurality of network elements 52, i.e., a plurality of interconnected network elements. The network 50 can provide connectivity and network services 54 at Layers 0, 1, 2, and/or 3. That is; the network 50 can be an optical network providing Time Division Multiplexing (TDM) and/or packet connectivity between the network clients 16 and the remote services 18. The network elements 52 can be switches, routers, Wavelength Division Multiplexing (WDM) platforms, Packet-Optical Transport Systems (POTS), and combinations thereof. The network elements 52 are hardware devices that transmit/receive/switch data in the network 50, and some or all of the network elements can be controlled by the SDN control plane 20. The network elements 52 are configured to collect network measurements, such as Operations, Administration, and Maintenance (OAM) data, such as packet counters, as well as performing functions such as Deep Packet Inspection (DPI) of packet headers for additional measurement data. In various embodiments, network measurements 56 are provided to the SDN control plane 20 from the network 50, network analytics 58 are provided to a pricing and resource management engine 60 which is configured to perform various aspects of the systems and methods to determine prices and implement network services for the network clients 16 in the network 50.

The CRM system 28 is a configured to track customer requests, services, billing and may present a view of the services to the customers and negotiate prices with the customer. The CRM system 28 is closely coupled, or even implemented as part of Business Support Systems BSSs) and Operations Support Systems (OSSs), and the CRM system 28 can be communicatively coupled to the network portal 24 and the service portal 26. The service database 30 contains information about currently active services and customer using them. The network analytics 58 includes a collection of current information about the network 50, such as, e.g., packet counters, allocated bandwidths, traffic patterns, connection behavior, and the like. The network analytics 58 can be performed in the SDN control plane 20 or in another application to analyzes information and produce inputs suitable for the revenue management, in the pricing and resource management engine 60. The SDN control plane 20 orchestrates services across the network 50, and may include several controllers (SDN, NFV) which are controlled by an orchestrator. The SDN control plane 20 manages bandwidth resources and provisions bandwidth, forwarding tables, optical spectrum, lasers, etc. The SDN control plane also manages compute and store resources for NFV Virtual Machines (VMs) and provisions and launches VMs. The network clients 16 can include customer premise equipment (CPE) that can be hardware network elements or software NFV elements configured to perform network edge functions.

The pricing and resource management engine 60 is configured to provide online prices, but may involve off-line processes to pre-calculate some of the pricing information from long-term trends. Pre-calculated pricing information may involve end-to-end pricing and amount of resources reserved for each price category. Pricing and resource management engine prices network resources and manages the price level at which they are committed, based on forecasted demands and relevant network usage information. In the network 10, the network resources are one or more of link bandwidth at Layer 0, 1, 2, and/or 3, network element ports, wavelengths, wireless spectrum, compute and storage resources, and Virtual Network Functions (VNF) resources. Network services may involve multiple layers of the protocols stack and even multiple VNFs in various spots in the network 10. Resources may be bandwidth, VNF licenses, VNF compute and storage resources, or wireless spectrum and infrastructure. The pricing and resource management engine 60 may include a global resource management with calendaring, but can also be used to determine spot prices for services requiring immediate connectivity.

Pricing of Network Services

Network services are sold at different prices because they offer different levels of QoS or QoE. For example, a smaller latency service is more expensive than larger latency service, a service with VNFs is more expensive than service without, a service with protection more expensive than service without, a service with higher QoS is more expensive than service with lower QoS, a service with more immediate access needs is more expensive than service that can wait, etc. However, two network services sold at different prices may still use the same resources; allocating the resource to a higher value service is preferred so that collected revenue is higher. For example, two services may share a link, which means that bandwidth should be allocated to a higher revenue service, two services may share VNF compute and storage resources, which should be allocated to a higher paying service, two services may share wireless spectrum, so higher paying service should be allocated the spectrum, etc.

Dynamic pricing can be accomplishing by forecasting what services are about to come into the network. Each arriving service should pay at least its opportunity cost. The opportunity cost is the foregone revenue if the service is accepted, but a higher paying service may come later to use the same resource. A common approximation to ensuring the opportunity costs are charged is to use price categories and put limits on each price category for each resource. Limits on lower paying services ensure the resources are not sold to lower paying services before higher paying services arrive.

Figure 2:
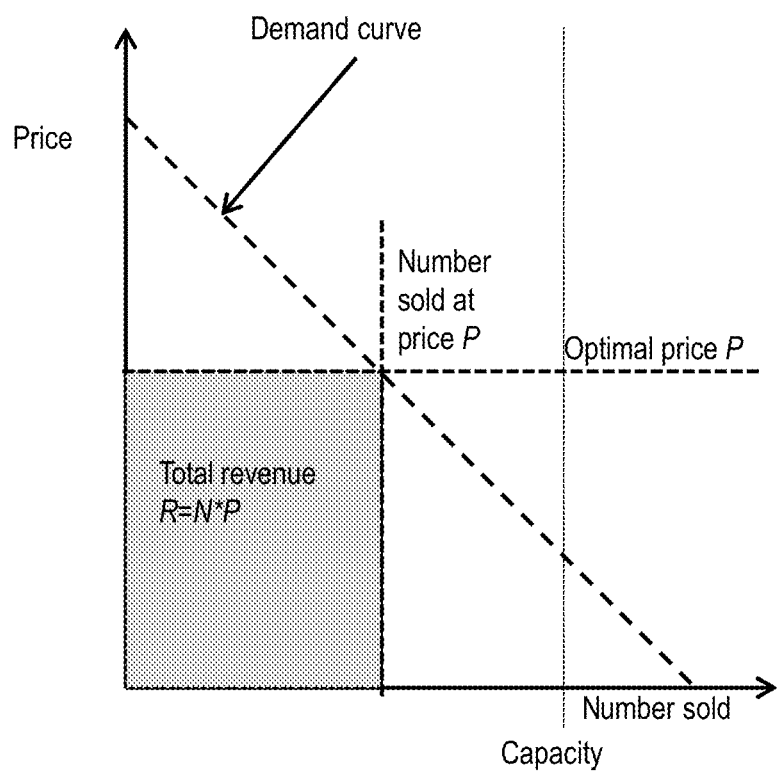
FIGS. 2 and 3 are graphs showing how differential product pricing increases revenues.
Figure 3:
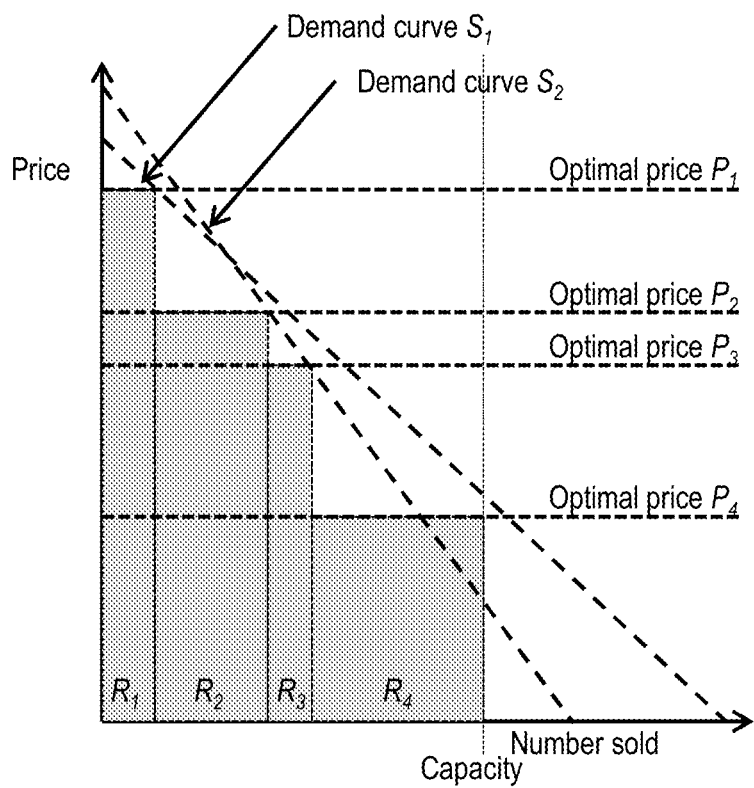

FIGS. 2 and 3 are graphs showing how differential product pricing increases revenues. Specifically, FIG. 2 illustrates non-differential product pricing and FIG. 3 illustrates differential product pricing. If there is only a single product type, the demand curve has a single optimal price, as shown in FIG. 2. The optimal price/demand point may not take full advantage of available capacity, and the only way to raise profits is to decrease costs. If there are multiple product types, there is an optimal price for each product (produced in a joint optimization of products), as shown in FIG. 3. Each product type has its own optimal price, and it is possible to fully fill capacity and maximize revenue. The optimal prices can be found with mathematical optimization if the demand curve is known. The risk of using this technique is in the spill over from higher paying product classes into lower paying product classes. This can be attained by introducing different conditions on the products, which entice higher paying customers to pay more. Value-based pricing may help by offering premium products to premium customers.

Pricing Based on Price Categories

The pricing mechanism based on price categories works by preventing admission to lower price services when higher price services may want to use the same resources at a later, overlapping, time. To accomplish this goal, each resource is partitioned into several price levels, which are adjusted based on expected demands in each future period. Resource partitioning can be done with a global optimization, which can be done in an off-line fashion, see, for example, Talluri and Van Ryzin "The theory and practice of revenue management," Kluwer Academic Publishers, 2005. The optimization partitions network resources so that revenue is maximized, based on the estimates of service requests in each price category.

Pricing is accomplished by routing demands over a network partitioned across price categories. The initial price categories are determined from service prices. Each category has a lower and upper bound chosen to cover a good number of end-to-end prices (see, for example, Talluri and Van Ryzin). Each network resource is partitioned into price categories. The partition can be hard (i.e. no overlap), or soft (i.e. nesting limits where higher price category can always use resources of lower price category). Price categories are assigned limits for each resource. The limit is used to ensure that only a limited portion of the resource is assigned to the price category.

An arriving request is binned into one of the price categories, based on its service definition and its service class. Then insufficient resources corresponding to appropriate price categories are removed (insufficient resources are resources which do not have sufficient capacity or sufficient capacity in the corresponding price category). Routing can be done on a pruned network topology. If a route exists, the request is allowed to enter the network in the allowed price category. Mapping of the service classes to price categories is determined by operator's policies. Mapping may be provided manually, or a listing price for the network service can be used (to map into price category range), where the listing price may be customer specific or global, or a customer can be started at the lowest price and then moved towards a higher price in competitive environments. Even if the resource can be admitted into the network at the listed price, it may be advantageous to increase the price based on current demand and inside knowledge of customer behavior. Steps can be taken to adjust the price within the selected price category based on current network utilization and expected future demand. Steps can be taken to adjust the price based on customer's elasticity curve.

Figure 4:
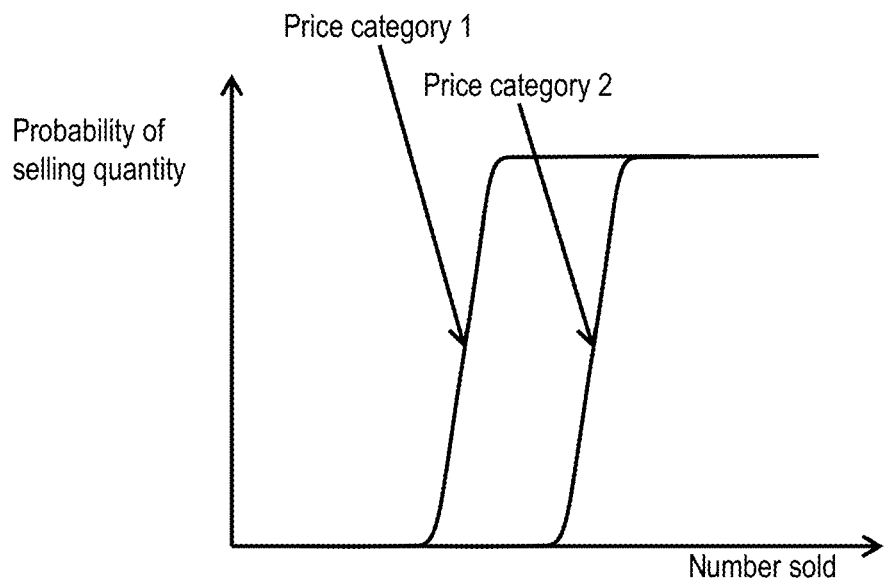
FIGS. 4 and 5 are graphs of price category limits based on marginal product revenue.
Figure 5:
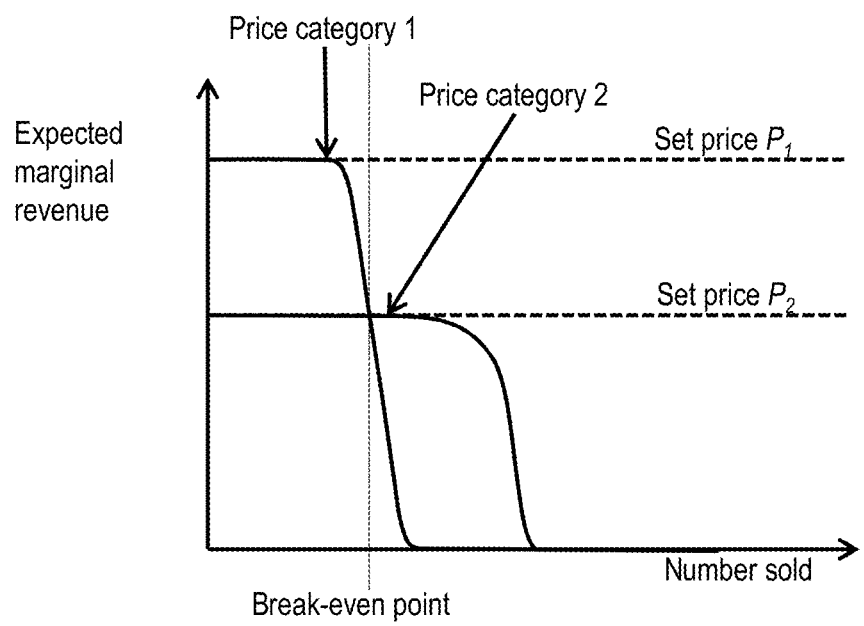

FIGS. 4 and 5 are graphs of price category limits based on marginal product revenue. FIG. 4 is a graph of selling probability versus number sold and FIG. 5 is a graph of expected marginal revenue versus number sold. Given two price categories (price category 1 that is higher than price category 2) what should be the quantity limit for each price category to maximize revenue? For example, should one only sell a cheaper product if the opportunity cost is less than its price? Each price category has a different expectation of the number of services that can be sold on it. Each price category has an independent market demand if product segmentation is done correctly. The revenue from selling a service in the cheaper price category may exceed the expected revenue of selling a more expensive service. The problem becomes finding a break-even point where the revenue from selling one cheaper services is higher than the expected revenue from selling one more expensive services. Price category limits are set to sell cheaper services only if one has sold more expensive services than the break-even point.

Timing of Network Pricing Actions

Figure 6:
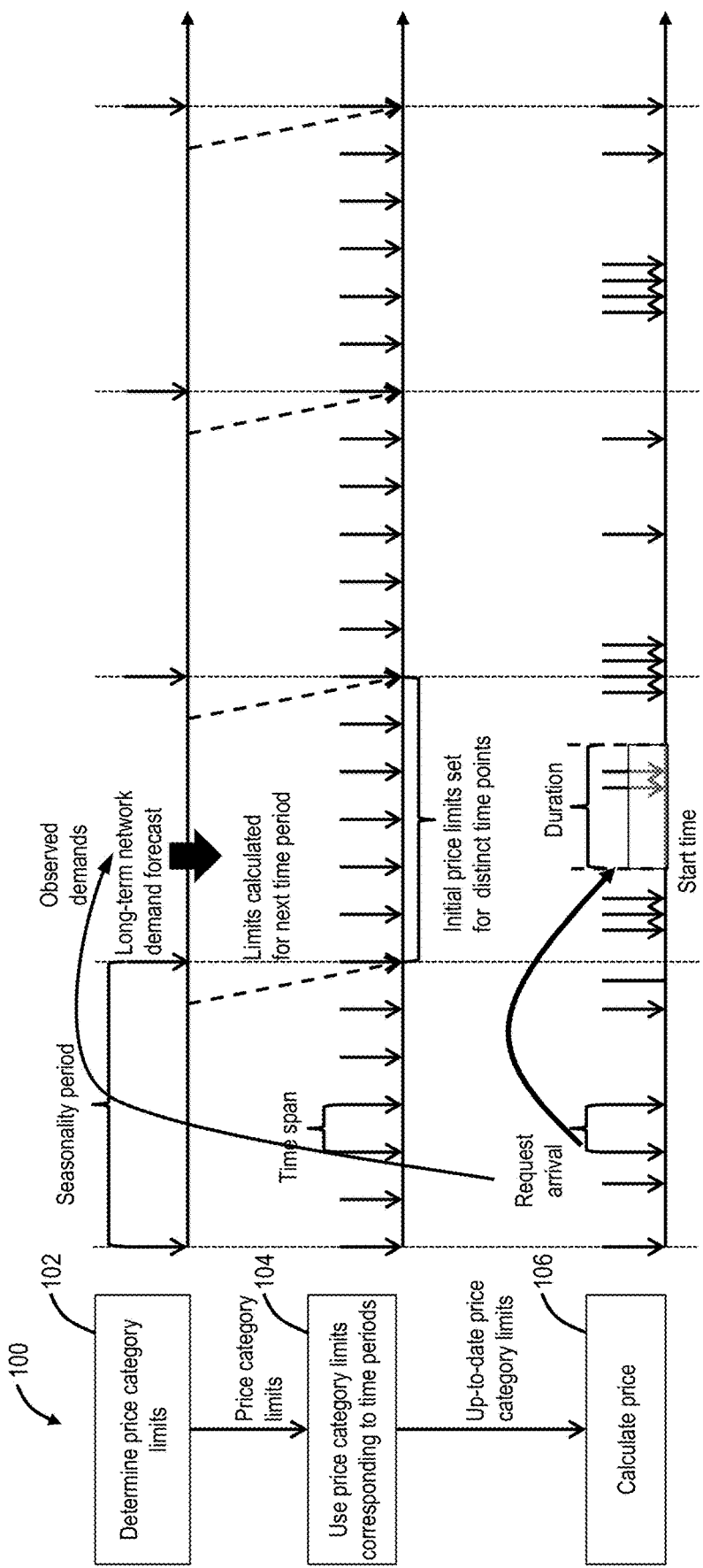
FIG. 6 is a flowchart and timing diagram of a network pricing process and associated network pricing actions.

FIG. 6 is a flowchart and timing diagram of a network pricing process 100 and associated network pricing actions. The network pricing process 100 includes determining price category limits (step 102), using the price category limits corresponding to time periods (step 104) and calculating price (step 106). The network pricing process 100 uses price category limits, which are determined from a forecast of network demands. The price category limits are determined from a forecast of network demands for each of the sub-period. Price limits are saved during the seasonality period and used for admission control. A table may be used to keep track of available resources in each time span (up-to-date category limits). The system may be implemented using a dynamic policy engine as described in commonly assigned U.S. patent application Ser. No. 14/605,161 entitled "DYNAMIC POLICY ENGINE FOR MULTI-LAYER NETWORK MANAGEMENT," the contents of which are incorporated herein by reference. The dynamic policy engine takes advantage of traffic seasonality to pre-calculate price category limits over the period of seasonality. The seasonality period is chosen so that from one period to the next the pre-calculated limits do not change. Pricing limits are determined before the seasonality period begins and are updated as services are added to the network.

Pricing and Resource Management

Figure 7:
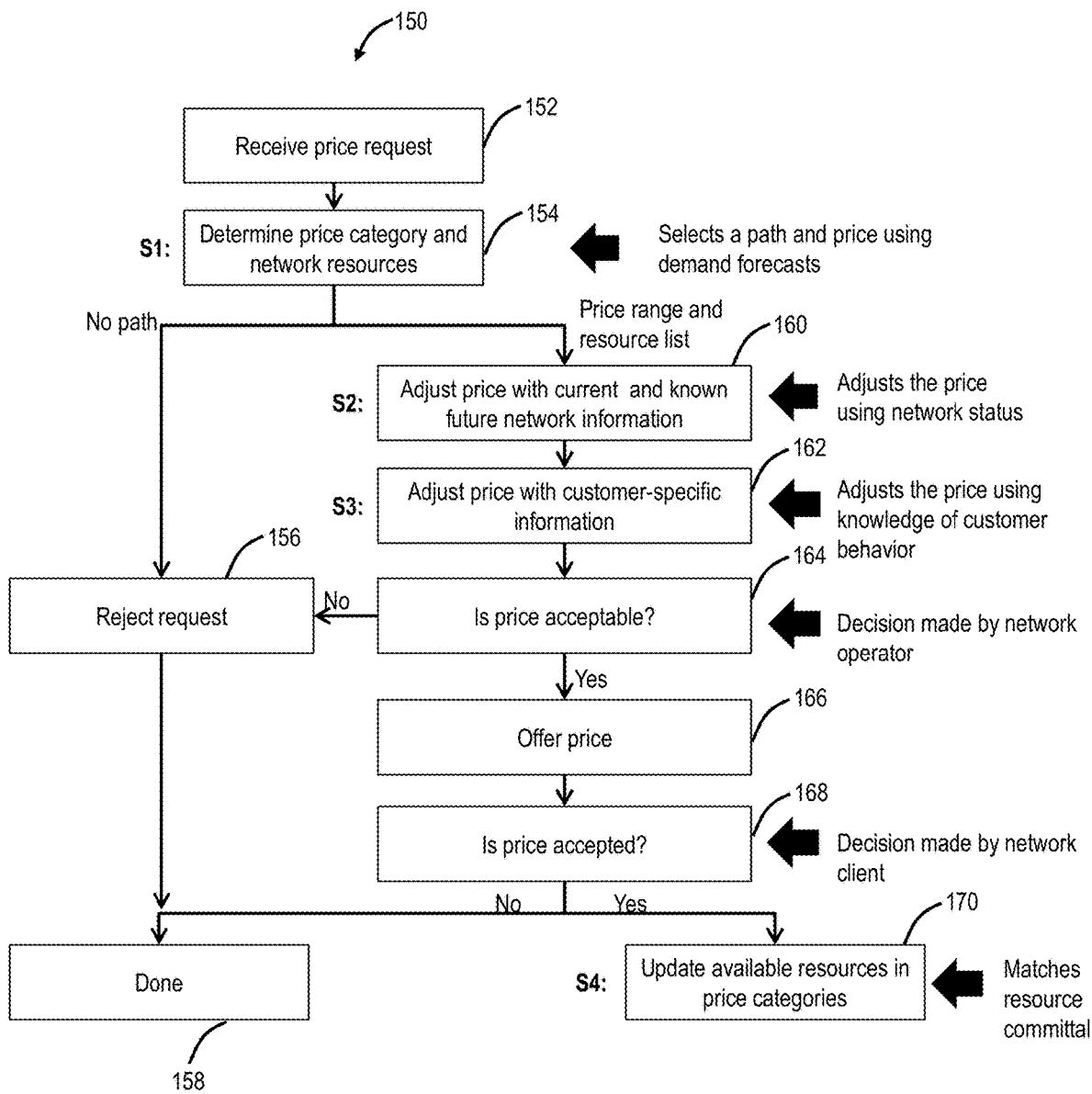
FIG. 7 is a flowchart of a pricing and resource management process.

FIG. 7 is a flowchart of a pricing and resource management process 150. Again, before the pricing is started, network resources are mapped into price categories (e.g., the process 100). Each price category is assigned a limit for each resource, in each time period, corresponding to the maximum amount of the resource that can be committed to that price category (in each of the time periods). Price category limits are determined by demand forecasts of each price category so that the expected revenue is maximized. This step can be accomplished using a network-wide stochastic optimization, whose inputs are expected network demands and available resources, and whose outputs are the price category limits. The number of periods used and their duration is dependent on the temporal pattern characteristics of network demands (e.g. diurnal, weekly, monthly, yearly pattern of demands) and accuracy of the forecasting mechanism.

The pricing and resource management process 150 works by determining the price in four main steps (labeled S1, S2, S3, S4 in FIG. 7). The pricing and resource management process 150 includes receiving a price request for a network service (step 152). Again, the network service is defined as a point-to-point, point-to-multipoint, or multipoint-to-multipoint connection or Virtual Private Network, which has an associated Service Level Agreement (SLA) committing the network to support a Quality-of-Service (QoS). That is, the network service provides bandwidth connectivity based on an SLA at one or more layers in a network.

The pricing and resource management process 150 includes determining a price category and network resources for the price request (step 154). The step 154 finds a price category that has a feasible path through the network during the period required by the price request. For example, a lowest available price category may be chosen, but other selections may also be possible to increase network efficiency and likelihood that the customer is accepted. The step 154 can include a path computation which may be performed by a Path Computation Element (PCE), an SDN controller, or some other device that selects a path and price using demand forecasts. After the step 154, the pricing and resource management process 150 produces a price range for the network service, which ensures that the opportunity cost of the network service is covered, and network throughput is maximized.

If there is no path, the pricing and resource management process 150 includes rejecting the price request (step 156) and the pricing and resource management process 150 is done (step 158). If there is a path, then the pricing and resource management process 150 can proceed with price adjustments. The pricing and resource management process 150 can include adjusting the price with current and known future network information (step 160). The step 160 determines a price in the price category that reflects the current and future known network status. Since the price category limits were chosen based on a forecast of network demands, an adjustment may be needed if the forecast was not accurate, which is done in this step 160. The price produced in this step 160 slides upwards as the utilization of the chosen category increases. Thus, the step 160 adjusts the price using the network status.

Next, the pricing and resource management process 150 can include adjusting the price with customer-specific information (step 162). This step 162 adjusts the price with the calculated assumption of that customer's willingness to pay for the network service. The price is adjusted with the information from a price elasticity curve, which can be obtained from customer responses saved from their previous pricing inquiries. The price, determined in the step 154 and adjusted in the steps 160, 162 can be examined for acceptability by the network operator (step 164). If the price is not acceptable to the network operator (step 164), the price request is rejected (step 156). If the price is acceptable (step 164), the price can be offered to the customer (step 166), who can determine whether or not to accept (step 168). For example, the step 164 can be implemented using the network portal 24, and the step 166 can be implemented using the service portal 26. If the price is not acceptable (step 168), the pricing and resource management process 150 is done (step 158). If the price is acceptable (step 168), the final step in the pricing and resource management process 150 is to update the available resources in the price categories after the network service is accepted into the network (step 170). In general, the update step 170 will decrease the allocation in the appropriate category of all the resources used for the network service.

Service Category to Price Category Mapping

Each end-to-end network service has a price, and the network service is defined by its end points, bandwidth, start time, duration, data-plane features (e.g. VNF), QoS, protection level, etc. The price is determined based on expected demand and includes adjustments for the number of hops, number of VNFs, the duration of the service, current and known future network information, customer-specific information, and the like. There is a mapping from network service to service class that can be used to improve the speed of calculating prices (not required as each network service can be one class). Each service class belongs in one price category. Multiple service classes may be mapped into one service category. Duration and A-Z may be criteria used for the service with same other properties in two different brackets. Service classes can be mapped into price categories. When the service request comes in it is mapped into a service class and then it is binned into one of the price categories. If the service class has a price point, then the price is used to bin/locate it into one of the price category buckets, and an attempt is made to route it at this price category end-to-end. If the service cannot be routed in the initial price category it may be bumped into a higher price category and routed again, or resources from lower price category may be used to augment the resources available in the initial price category.

Price categories exist in multiple time spans and may change depending on when the network service is requested. The purpose of the time spans is to handle service requests with different durations. The duration of the request corresponds to the number of time spans it occupies, and the duration of each time span since time spans are not required to be the same duration. Each time span has its own price category limits (due to the difference in demands in each time span). The knowledge of demands may be different (better knowledge is available closer to service time), so it makes sense to allow for different price limits at different times away from the service time (i.e. there may be multiple price category limits corresponding to time spans for different request times, or the price category limits for time spans may be updated as the service time becomes closer). Each network resource is given a maximum allocation for each price category. Price category levels at each resource are allocated based on expected demand in each period (Time Span or TS). If resources are committed to the service, the available resources for the price category of that resource are decreased in each time span used by the service. Service classes are used to group services with similar revenue or similar feature set. There could be many more service classes than price categories. Each A→Z is considered a separate service and each set of features added to each A→Z is a separate service. Using service classes compresses the number of services to a manageable set and allows each of the operators to implement their service classes and mapping from services to service categories.

Service and Price Category Example

Figure 8:
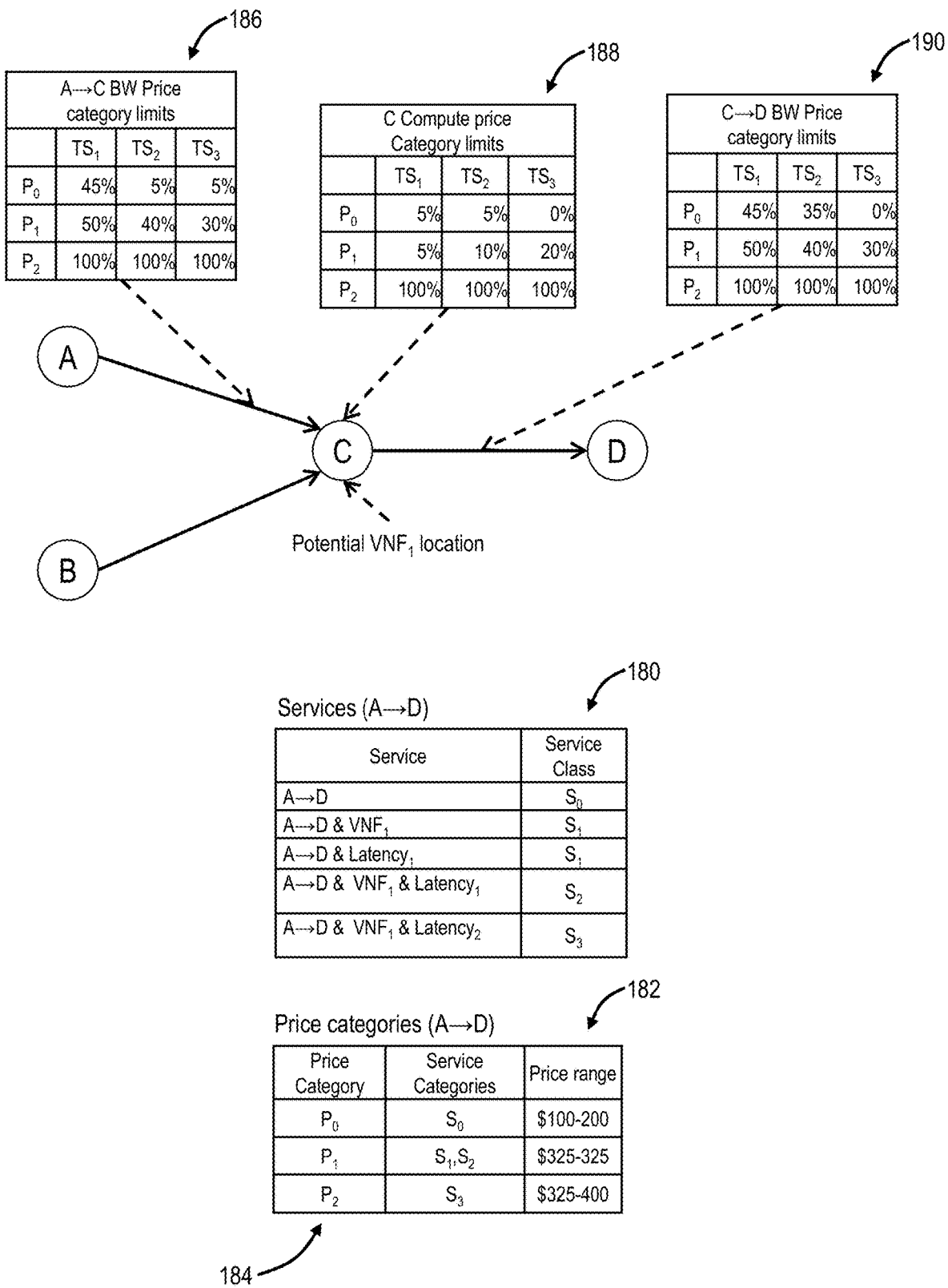
FIG. 8 is a block diagram of an operation of determining path and price adjustment.

FIG. 8 is a block diagram of an operation of determining path and price adjustment. FIG. 8 is used to show how the pricing works in an embodiment. The network services are mapped into service classes 180 based on the policy provided by the operator ("Services A→D"). At the same time, price categories are defined network wide with price ranges 182 ("Price categories A→D"). Each network resource is portioned into the three price categories 184 as shown in the tables (for bandwidth on links A→C and C→D and compute resources at node C). Each price category 184 is assigned a portion of the resources for each available time-span ($TS_1$, $TS_2$, $TS_3$), in resource tables 186, 188, 190 illustrating available resources for each price category. The way the resource table is interpreted is that a price category 184 cannot use more than the specified portion of the entire resource for the corresponding time span ($P_0$ traffic cannot use more than 5% of bandwidth on link A→C in time-span $TS_3$). This table is updated each time a service is accepted into the network. For simplicity, assume that all links have the same bandwidth.

Using the scenario in FIG. 8, various example service requests are treated as follows:

For a plain connectivity network service A→D, requiring 5% of bandwidth in time-span $TS_1$. The network service is mapped to service class $S_0$, which is in price category $P_0$, which has sufficient bandwidth on both links during that time-span period. If the network service is admitted, the link tables are updated to read $P_0$ with 40% in $TS_1$.

For a plain connectivity network service A→D, requiring 5% of bandwidth in time-span $TS_3$, the network service may be rejected since link C→D does not have a sufficient allocation in $TS_3$ for price category $P_0$ or offered to upgrade to price category $P_1$.

For a network service A→D with $VNF_1$, requiring 5% of bandwidth and 10% of compute resources at node C during time spans $TS_1$ and $TS_2$. The network service is mapped to price category $P_1$. Note that node C does not have sufficient resources at $TS_1$, so the network service should be rejected, upgraded to the next price category, or scheduled at a later time. Assume that the network service was requested with a flexible start time, so an alternative of time spans $TS_2$ and $TS_3$ is offered at the price level $P_1$.

Note that this example shows only one possible embodiment. In the accompanying description, there are, in fact, many other possible embodiments, due to the number of different embodiments for each of the steps S1-S4 in the pricing and resource management process 150.

Figure 9:
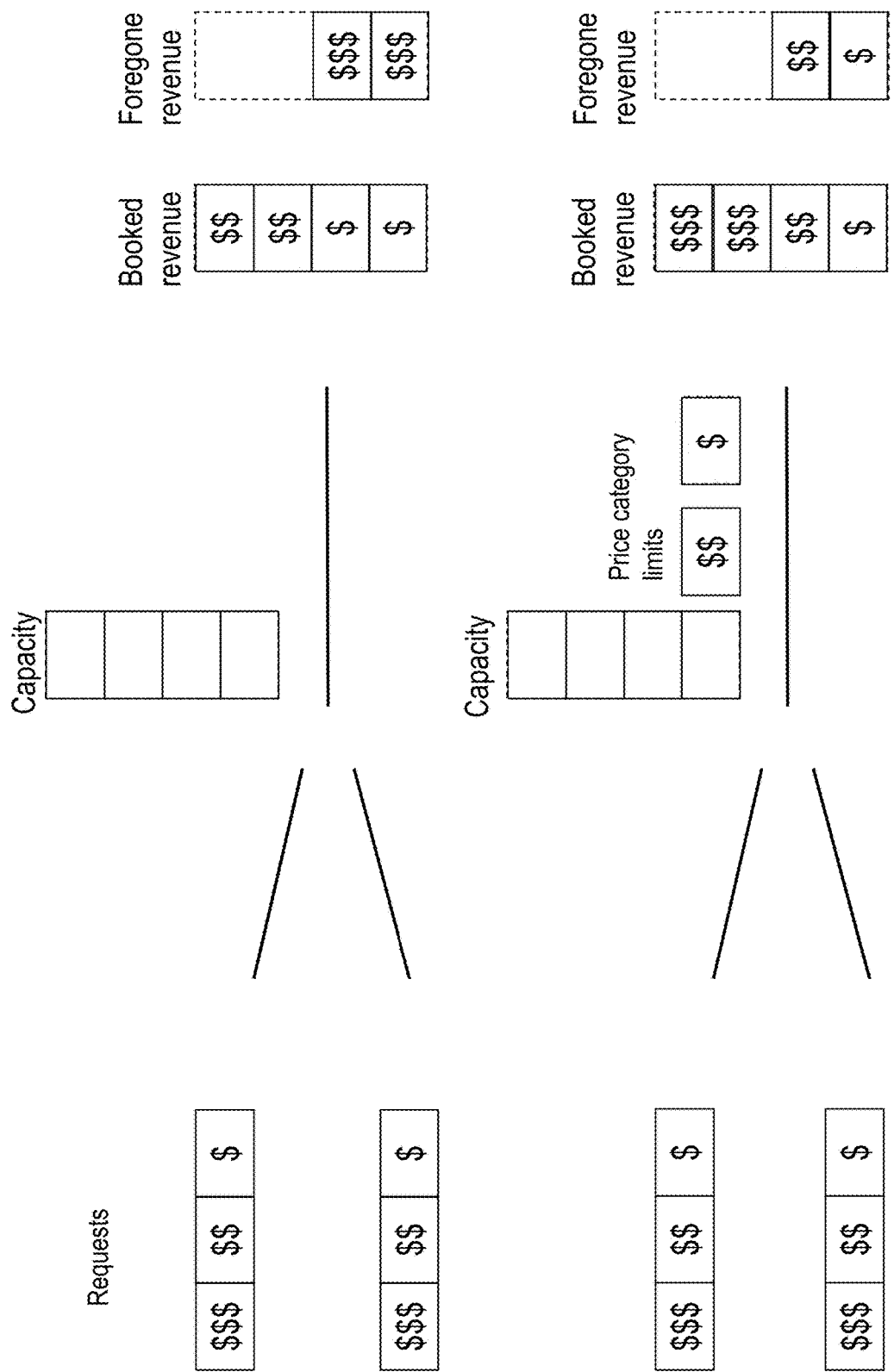
FIG. 9 is a block diagram illustrating the pricing described herein (bottom) versus conventional techniques of first come, first served (top)

FIG. 9 is a block diagram illustrating the pricing described herein (bottom) versus conventional techniques of first come, first served (top). As can be seen in FIG. 9, the systems and methods provide additional revenue while forgoing less revenue versus conventional techniques. That is, by using the category limits, additional revenue is achieved.

Resource Reservations with Tokens

Figure 10:
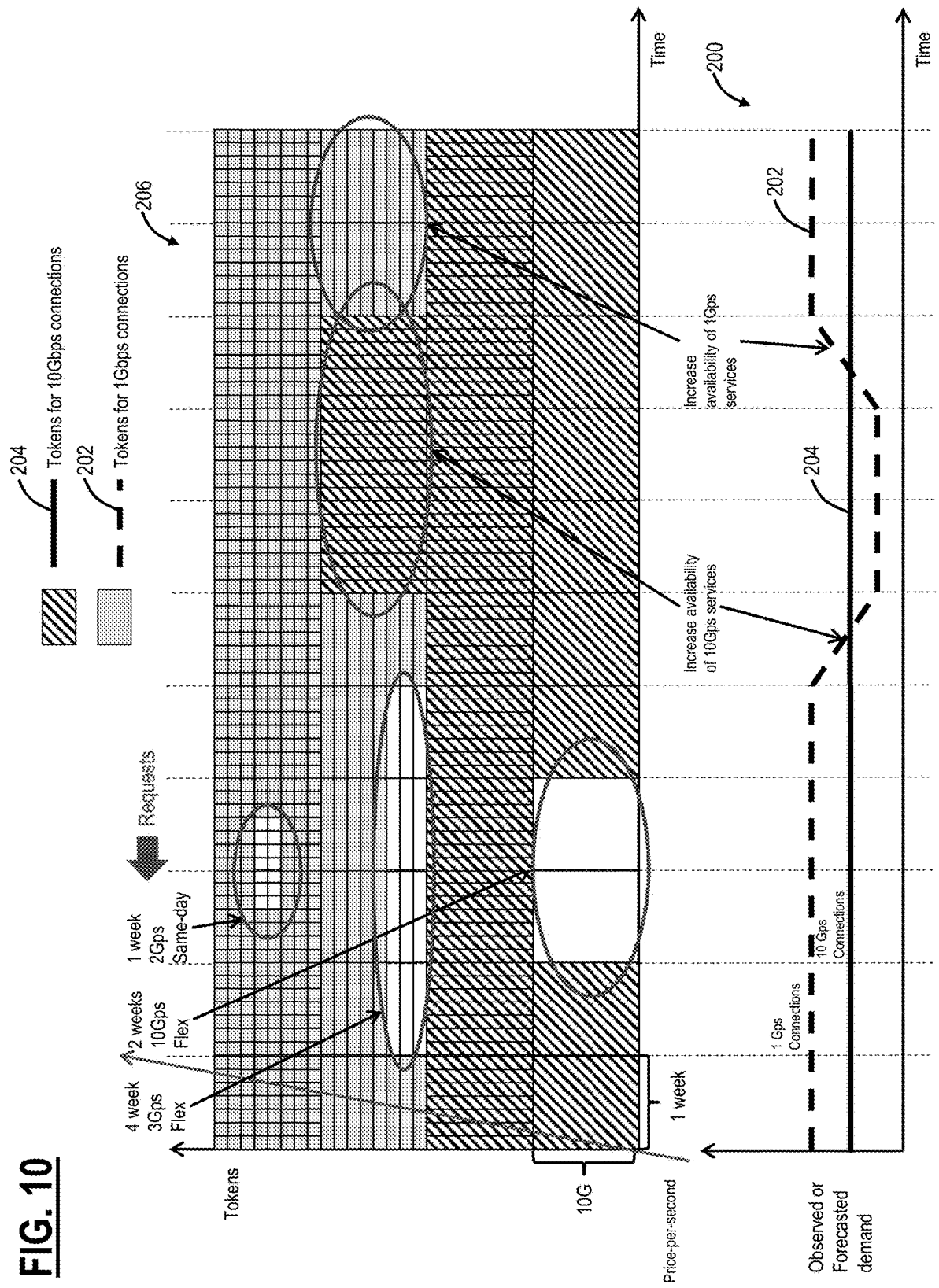
FIG. 10 is a block diagram illustrating use of tokens to assign price buckets (used as pricing limits)

FIG. 10 is a block diagram illustrating the use of tokens to assign price buckets (used as pricing limits). FIG. 10 includes a graph 200 illustrating observed or forecasted demands for 1 Gbps connections 202 and 10 Gbps connections 204. Tokens 206 may also be assigned prices (a final price is a sum of tokens). The tokens 206 are used instead of price limits across categories. Each link is assigned a number of tokens of different duration and with different prices. Instead of pruning requests based on the existence of pricing limits in multiple categories, links are pruned if insufficient tokens are not present.

Determine Price Category and Network Resources

Figure 11:
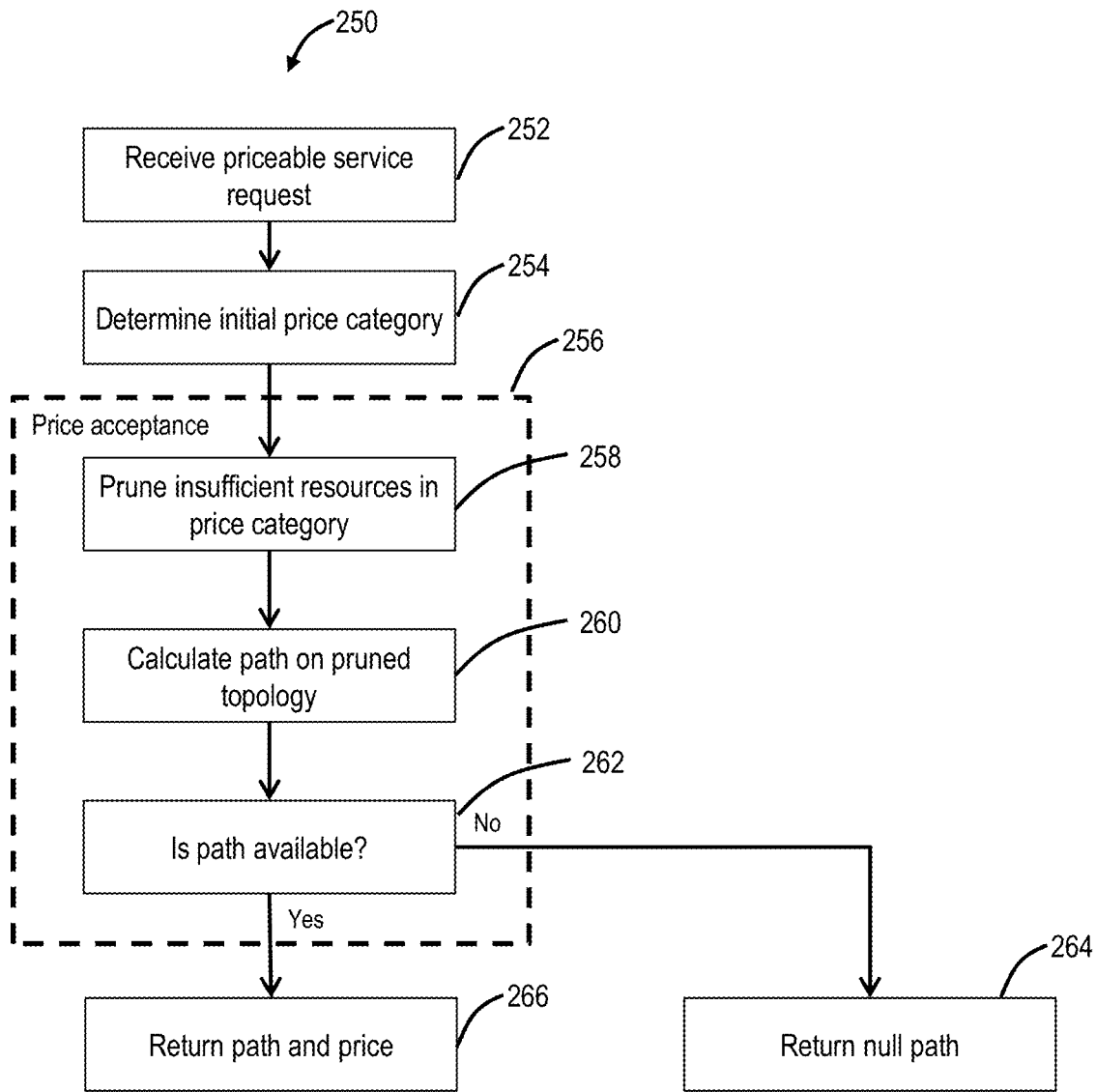
FIG. 11 is a flowchart of an embodiment of the pricing and resource management process of FIG. 7 illustrating a process for price categories and network resources.

FIG. 11 is a flowchart of an embodiment of the pricing and resource management process 154 of FIG. 7 illustrating a process 250 for determining price categories and network resources. Price acceptance is required to ensure the initial price category is used to route the request if possible. In this example, no effort is made to accommodate a user with alternative price, other than the price in the price category. If no path can be found in the price category, the user is rejected. Service may be accepted if the user accepts the price. The process 250 includes receiving a priceable service request (step 252), determining an initial price category (step 254), and performing price acceptance (step 256). The price acceptance step 256 includes pruning insufficient resources in the price category (step 258), calculating the path on a pruned topology (step 260), and determining if a path is available (step 262). If the path is not available (step 262), the process 250 includes returning a null path (step 254); else, the process 250 returns the path and its associated price (step 266).

Determine Price Category and Network Resources (with Upsell Bumping)

Figure 12:
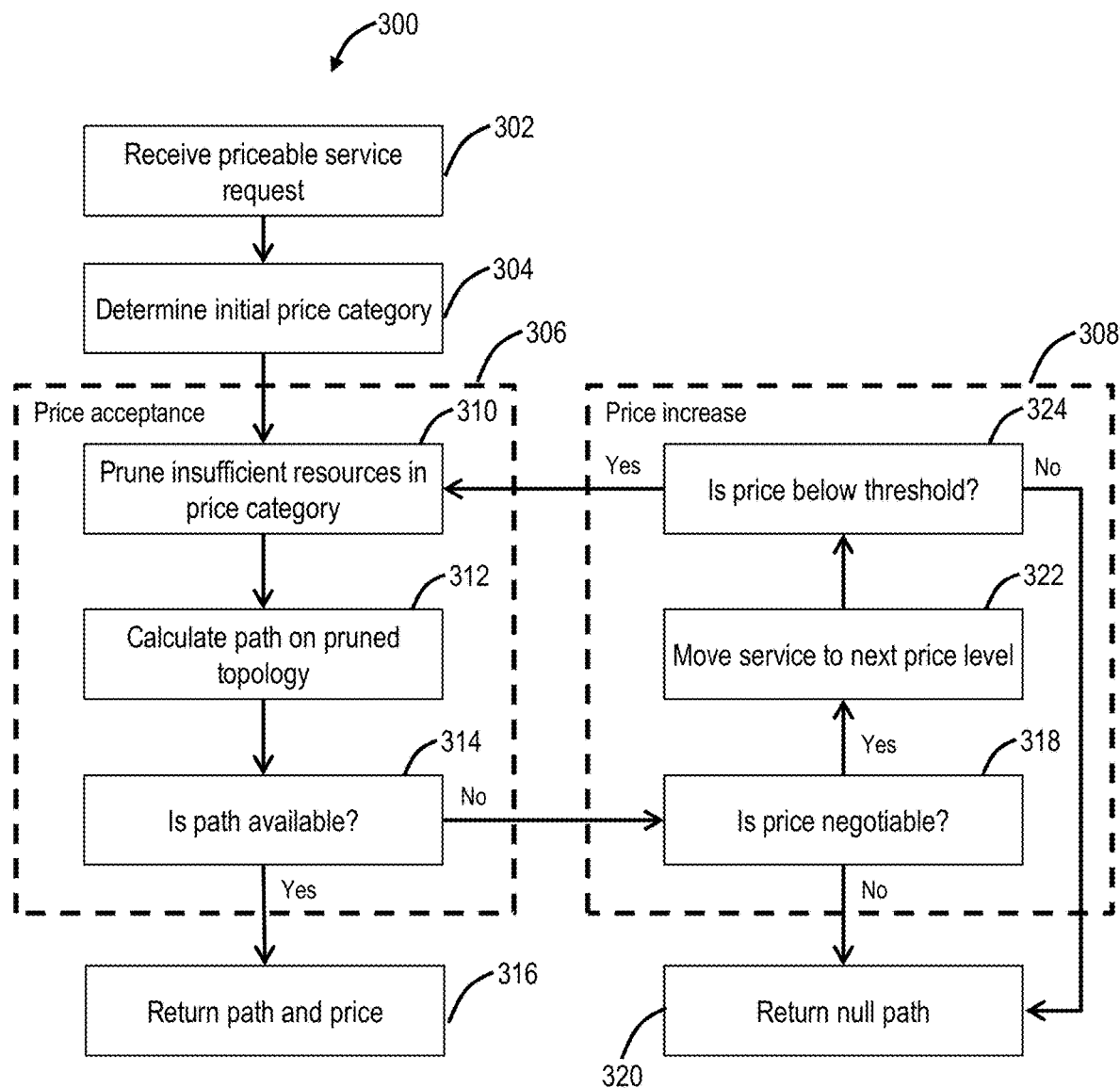
FIG. 12 is a flowchart of an embodiment of the pricing and resource management process of FIG. 7 illustrating a process for determining price categories and network resources with upsell bumping.

FIG. 12 is a flowchart of an embodiment of the pricing and resource management process 150 of FIG. 7 illustrating a process 300 for determining price categories and network resources with upsell bumping. Again, price acceptance is required to ensure the initial price category is used to route the request if possible. In this example, if the price cannot be found in the original price category an effort is made to find sufficient resources in a higher price category. If resources are found in the higher price category, the user may be offered a higher price than the original price. If no path can be found in the original price category, or one of the higher price categories, the user is rejected. Service may be accepted if the user accepts the price.

The process 300 includes receiving a priceable service request (step 302), determining an initial price category (step 304), performing price acceptance (step 306), and optionally performing a price increase (step 308). The price acceptance step 306 includes pruning insufficient resources in the price category (step 310), calculating the path on a pruned topology (step 312), and determining if the path is available (step 314). If the path is available (step 314), the path and its associated price are returned (step 316). Now, unlike the process 250, if the path is not available (step 314), the process 300 includes the price increase steps 308. If the price is not negotiable (step 318), the process 300 includes returning a null path (step 320); else, the process 300 includes moving the service to a next price level (step 322). If the price, in the next price level is not below a threshold (step 324), the process 300 includes returning a null path (step 320); else, the process 300 includes pruning insufficient resources in the price category, which is based on the next price level (step 310).

Determine Price Category and Network Resources (with Lower Price Category Inclusion)

Figure 13:
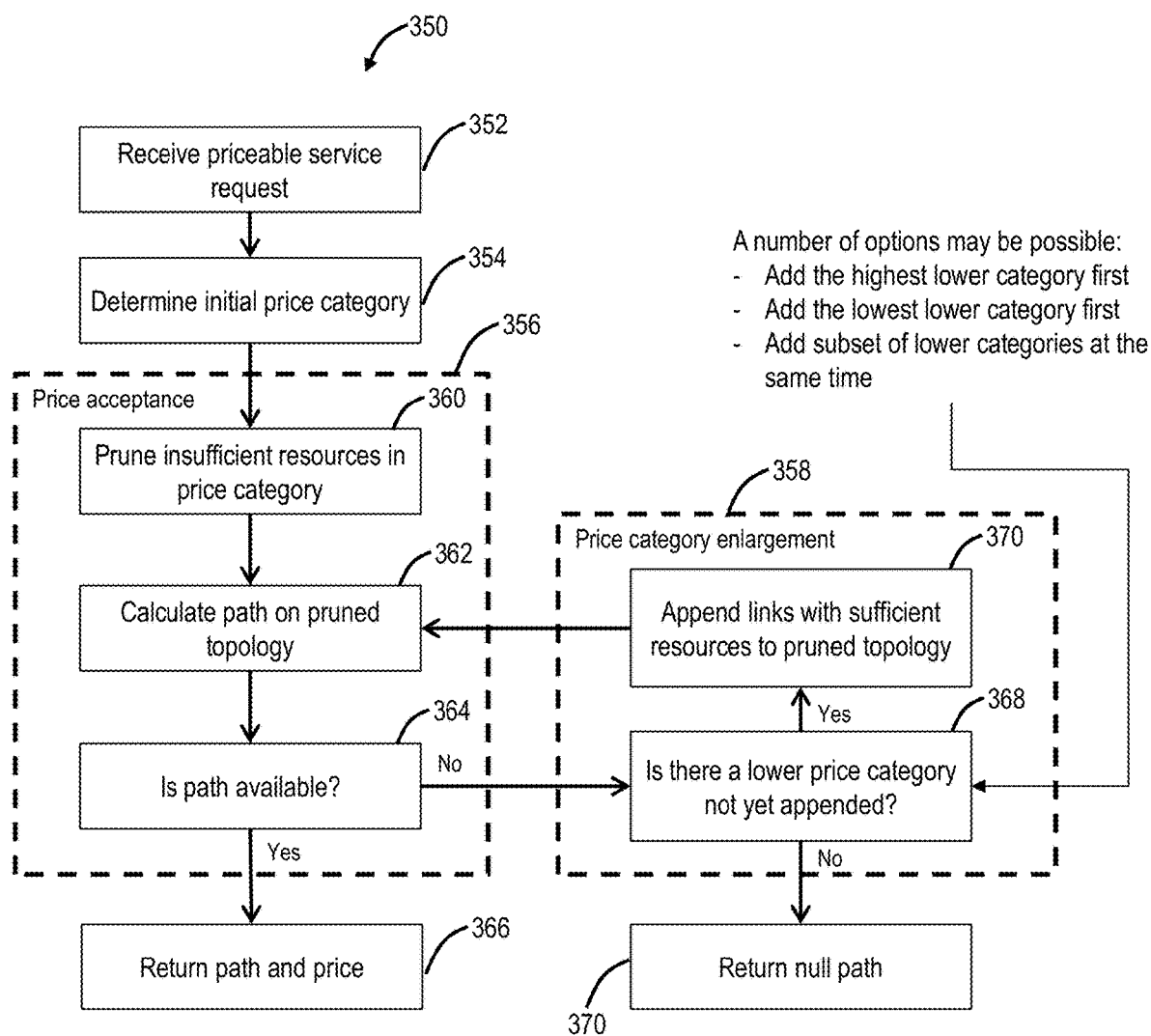
FIG. 13 is a flowchart of an embodiment of the pricing and resource management process of FIG. 7 illustrating a process for determining price categories and network resources with lower price category inclusion.

FIG. 13 is a flowchart of an embodiment of the pricing and resource management process 150 of FIG. 7 illustrating a process 350 for determining price categories and network resources with lower price category inclusion. Again, price acceptance is required to ensure the initial price category is used to route the request if possible. In this example, an effort is made to accommodate a user with resources from a lower price category, at the price of the original price category. If no path can be found in the original price category, or with resources available in lower price categories, the user is rejected. Service may be accepted if the user accepts the price.

The process 350 includes receiving a priceable service request (step 352), determining an initial price category (step 354), performing price acceptance (step 356), and optionally performing price category enlargement (step 358). The price acceptance step 356 includes pruning insufficient resources in the price category (step 360), calculating the path on a pruned topology (step 362), and determining if the path is available (step 364). If the path is available (step 364), the path and its associated price are returned (step 366). If the path is not available (step 364), the process 350 can perform the price category enlargement steps 358 which include determining if there is a lower price category not yet appended (step 368). Here, a number of options may be possible, such as adding the highest lower category first, adding the lowest lower category first, adding a subset of lower categories at the same time, etc. If there is not a lower price category (step 368), the process 350 includes returning a null path (step 370); else, the process 350 includes appending links with sufficient resources to the pruned topology (step 372) and returning to the step 362.

Determine Price Category and Network Resources (Combined)

Figure 14:
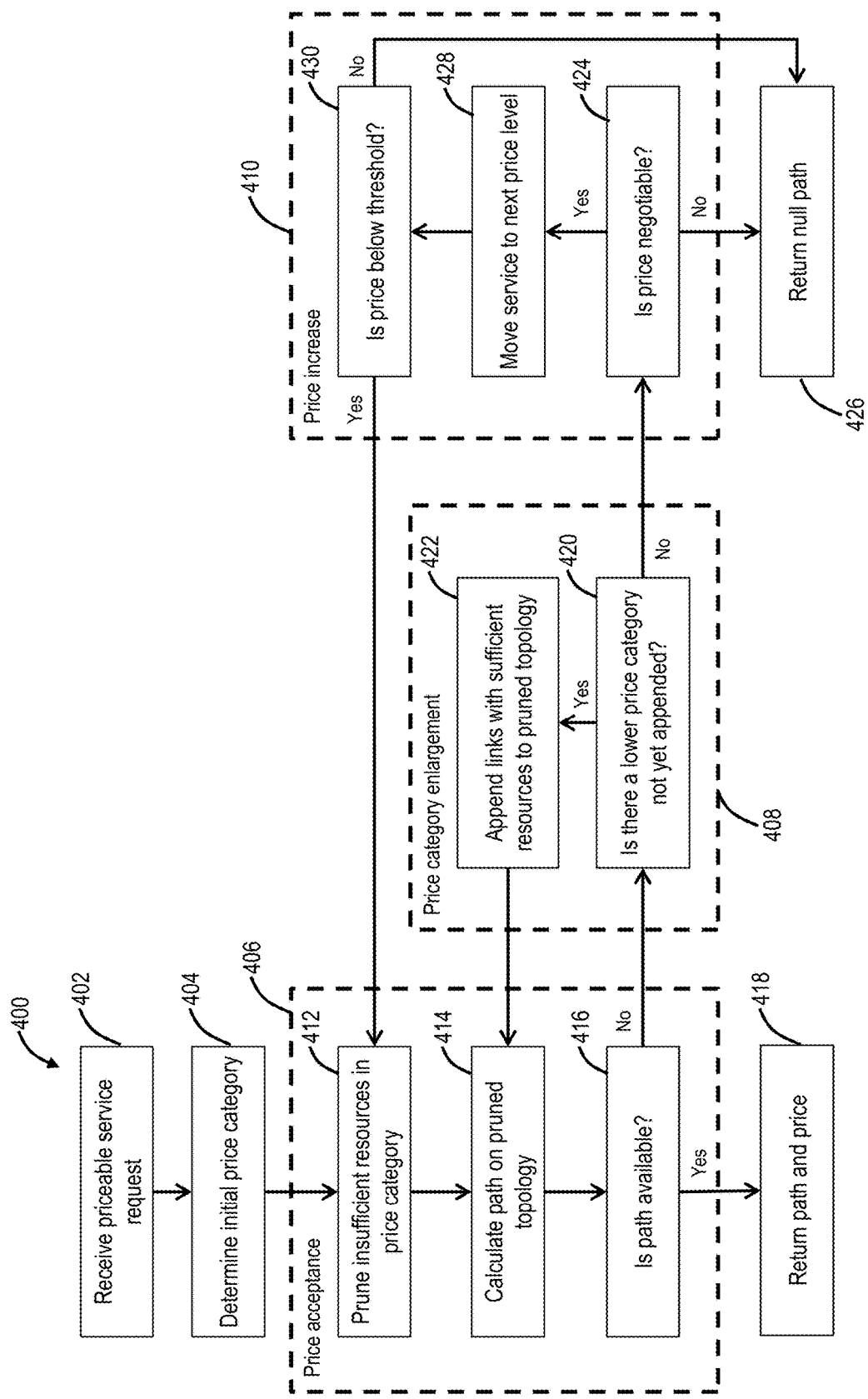
FIG. 14 is a flowchart of an embodiment of the pricing and resource management process of FIG. 7 illustrating a process for determining price categories and network resources which combine the upsell bumping from the process of FIG. 12 and the lower price category inclusion from the process of FIG. 13.

FIG. 14 is a flowchart of an embodiment of the pricing and resource management process 150 of FIG. 7 illustrating a process 400 for determining price categories and network resources which combine the upsell bumping from the process 300 and the lower price category inclusion from the process 350. Again, price acceptance is required to ensure the initial price category is used to route the request if possible. In this example, an effort is made to accommodate a user with alternative price or by enlarging the pool resources with resources from lower price categories, other than the price in the price category. If no path can be found in the original price category, resources from one or more lower classes may be used to find a path. If no path is found using resources from lower price categories, the resources of higher price categories are also examined. The user is priced in the highest price category with resources used on the path. The service may be accepted if the user accepts the price.

The process 400 includes receiving a priceable service request (step 402), determining an initial price category (step 404), performing price acceptance (step 406), optionally performing price category enlargement (step 408), and optionally performing a price increase (step 410). The price acceptance step 406 includes pruning insufficient resources in the price category (step 412), calculating the path on a pruned topology (step 414), and determining if the path is available (step 416). If the path is available (step 416), the path and its associated price are returned (step 418). If the path is not available (step 416), the process 400 can perform the price category enlargement steps 408 which include determining if there is a lower price category not yet appended (step 420). Here, a number of options may be possible, such as adding the highest lower category first, adding the lowest lower category first, adding a subset of lower categories at the same time, etc. If there is not a lower price category (step 420), the process 350 includes performing the price increase steps 410; else, the process 400 includes appending links with sufficient resources to the pruned topology (step 422) and returning to the step 414.

For the price increase steps 410, if the price is not negotiable (step 424), the process 400 includes returning a null path (step 426); else, the process 400 includes moving the service to a next price level (step 428). If the price, in the next price level is not below a threshold (step 430), the process 400 includes returning a null path (step 426); else, the process 400 includes pruning insufficient resources in the price category, which is based on the next price level (step 412).

Determining Path and Price Category Details

The purpose of the pricing and resource management processes 250, 300, 350, 400 is to find the lowest price that maximizes revenue. The lowest price is important in competitive environments. However, the lowest competitive price may not be acceptable if future higher paying customers are anticipated. If both price acceptance and price increase/category enlargement steps are used, the pricing and resource management processes 250, 300, 350, 400 work as a loop, which has a current price category in each iteration. The initial price category is chosen as the lowest possible price category that still meets pricing requirements. A price threshold is used to ensure services are not sold at too low of a price (to meet the opportunity cost). For a widest range of price search, the threshold is set to 0. A threshold may also be set based on the advertised price of the service (i.e. lowest service price may be advertised). Resources with insufficient remaining capacity for the current price category are pruned from the network topology. Each resource has an assignment of capacity for each price category. Each resource price category is checked if resources are sufficient and if not the resource is pruned from the topology.

The path can be calculated using a shortest path algorithm, possibly with an external Path Computation Element (PCE), Software Defined Networking (SDN) controller or other path computation device. For scheduled services the PCE algorithm with scheduling can be used (see, for example, commonly assigned U.S. patent application Ser. No. 14/516,985 filed Oct. 17, 2014 and entitled "OPTICAL AND PACKET PATH COMPUTATION AND SELECTION SYSTEMS AND METHODS," the contents of which are incorporated herein by reference).

If a path cannot be found for the current price category level, it is possible to raise the price category to the next category to preserve future revenue. This step is executed if the price is negotiable, e.g. if the portal 24, 26 only promises to return the lowest available price (If the customer is promised a fixed price for services, the customer resource request may be rejected due to opportunity cost). A maximum threshold is used to ensure that selected price level is not too high. For example, a customer may be promised a price limit for services. A higher price category may be included by appending links to a current set of non-pruned links. If a path cannot be found for the current price category level, it is also possible to include links available in lower categories. Several ways of including links are possible (e.g. all lower categories, subset of lower categories, the lowest remaining price category, the highest remaining price category). Appending links to pruned topology—if several price categories are used on a link the maximum of their available limits is used for constrained path computation. The process returns a path, which has been reserved for the network. A loose path may be used for identification (no actual resources reserved). Resources may be temporarily reserved, but not committed until confirmation that the price was accepted.

Price Adjustment with Current and Known Scheduling Information

Prices are adjusted to introduce finer granularity in price categories and ensure the latest information is incorporated into the price. There can only be a few categories to make bandwidth partitioning in terms of bandwidth fragmentation, so price range of each category may be large. Price categories are based on demand forecast obtained from historical measurements and may be out of date. This becomes especially relevant if the user's price was bumped up, in which case we should ensure that the potential of higher paying service is accurately estimated. In general, price adjustment picks a price inside the price range of the price category. If the price is lower than the lower price range, the opportunity cost may not be met by the offered price. If the price is higher than the upper price range, customer may reject too high a price. The current estimate of network load is calculated for the price category. The busier the price category is, the closer the price should be to the higher price limit of the category. One way to evaluate how busy a category is by evaluating the utilization on the links on the path used (with the weighted average sum of the links, or with the maximum of all links). Another way is to find the max-flow possible between the end points of the service with current limits and divide it with the max-flow with price category limits set before any pricing.

The price can be adjusted by multiplying the price of the category by the adjustment factor that depends on the utilization, such as according to the following formula:

$$P_{adj} = \overline{P} \times A(u)$$

$\overline{P}$ is the price in the price range of selected price category $A(u)$ is the adjustment factor $P_{adj}$ is the adjusted price u is the current estimate of business (e.g. average utility of the price category on the links)

A special case of appending a lower level price category to the pruned topology means that the utilization in the initial category is 1.0.

Figure 15:
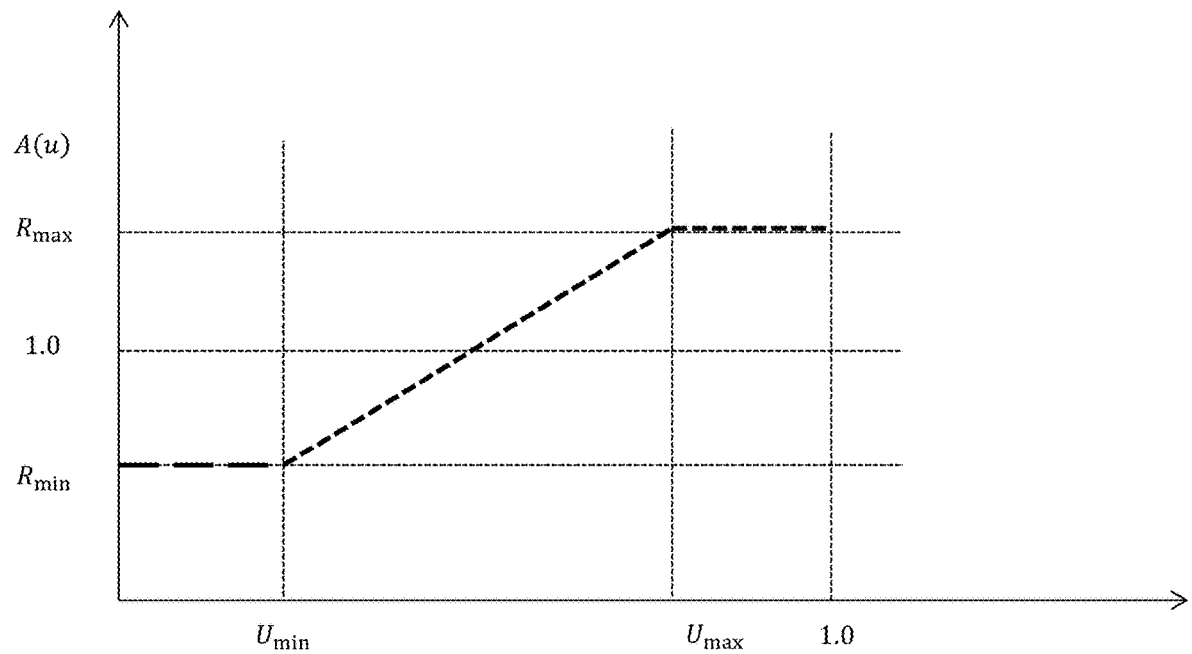
FIG. 15 is a graph of an example price adjustment curve.

FIG. 15 is a graph of an example price adjustment curve. There is a minimum price acceptable $R_{min}$ and maximum price acceptable $R_{max}$ and price is increased gradually between them. $\overline{P}$ can be selected so that $\overline{P}R_{min}$ corresponds to the lower price limit of price category and $\overline{P}R_{max}$ corresponds to the upper price limit of the price category. If $R_{min} = R_{max} = 1.0$ there is no price adjustment and $\overline{P}$ is chosen as a representation of the price category (i.e. the average price).

Customer-Specific Price Adjustment

Figure 16:
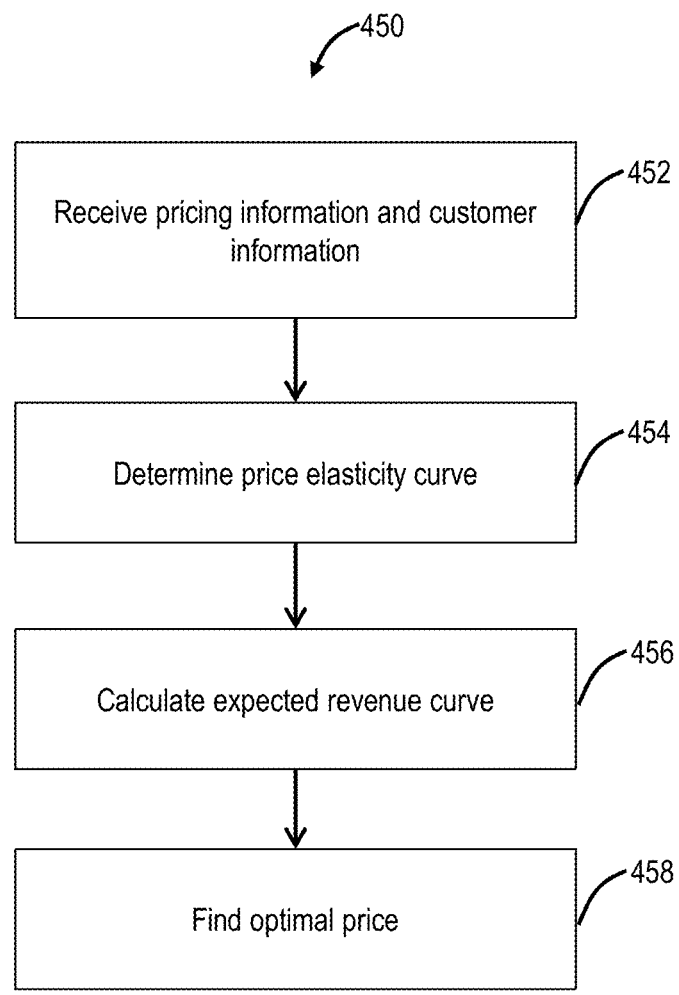
FIG. 16 is a flowchart of a customer-specific price adjustment.
Figure 17:
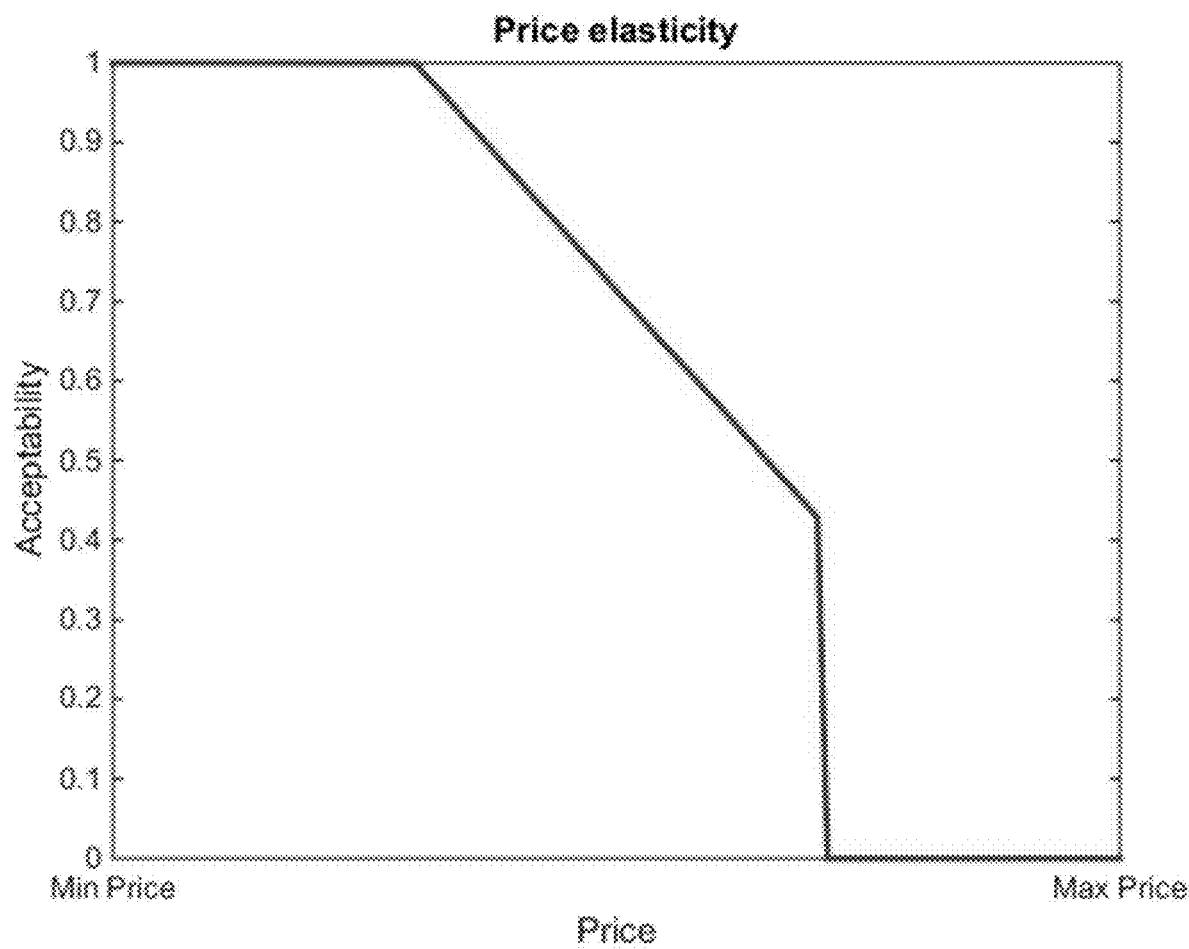
FIG. 17 is a graph of estimated price elasticity.

FIG. 16 is a flowchart of a customer-specific price adjustment process 450. As described herein, "customer-specific" refers to information about one specific customer, or a group of customers, which may be grouped by type (i.e., enterprise, residential, industry etc.), or geography, or any other possible grouping. The customer-specific price adjustment process 450 includes receiving pricing information and customer information (step 452), determining a price elasticity curve (step 454), calculating an expected revenue curve (step 456), and finding an optimal price (step 458). The price information is known after the determining path and price steps in the pricing and resource management processes 250, 300, 350, 400. The price information may be a range of prices, the price information may be a range of the price category, or, a price based on the macro-price adjustment and a lower limit for the price. The purpose of the customer-specific price adjustment process 450 is to ensure the likelihood of customer accepting the offered price. Some customers may be willing to pay a premium for the service above the lowest price. Some customers may be unwilling to pay even the lowest price, which may require discounting. The price elasticity curve is known from previous customer pricing interaction. Customer responses are recorded to keep track of customer willingness to pay for a service. If insufficient information exists for a specific customer, a group of customers, or price range price elasticity curve may be obtained from other less specific customer responses (i.e. other similar customers, or other similar services or price ranges). The price elasticity curve is used to determine the highest price customer is most likely to pay: V. Agrawal, M. Ferguson, "Bid-response models for customised pricing," Journal of Revenue and Pricing Management (2007) 6, 212-228. doi:10.1057/palgrave.rpm.5160085. For example, FIG. 17 illustrates an example price elasticity curve.

Figure 18:
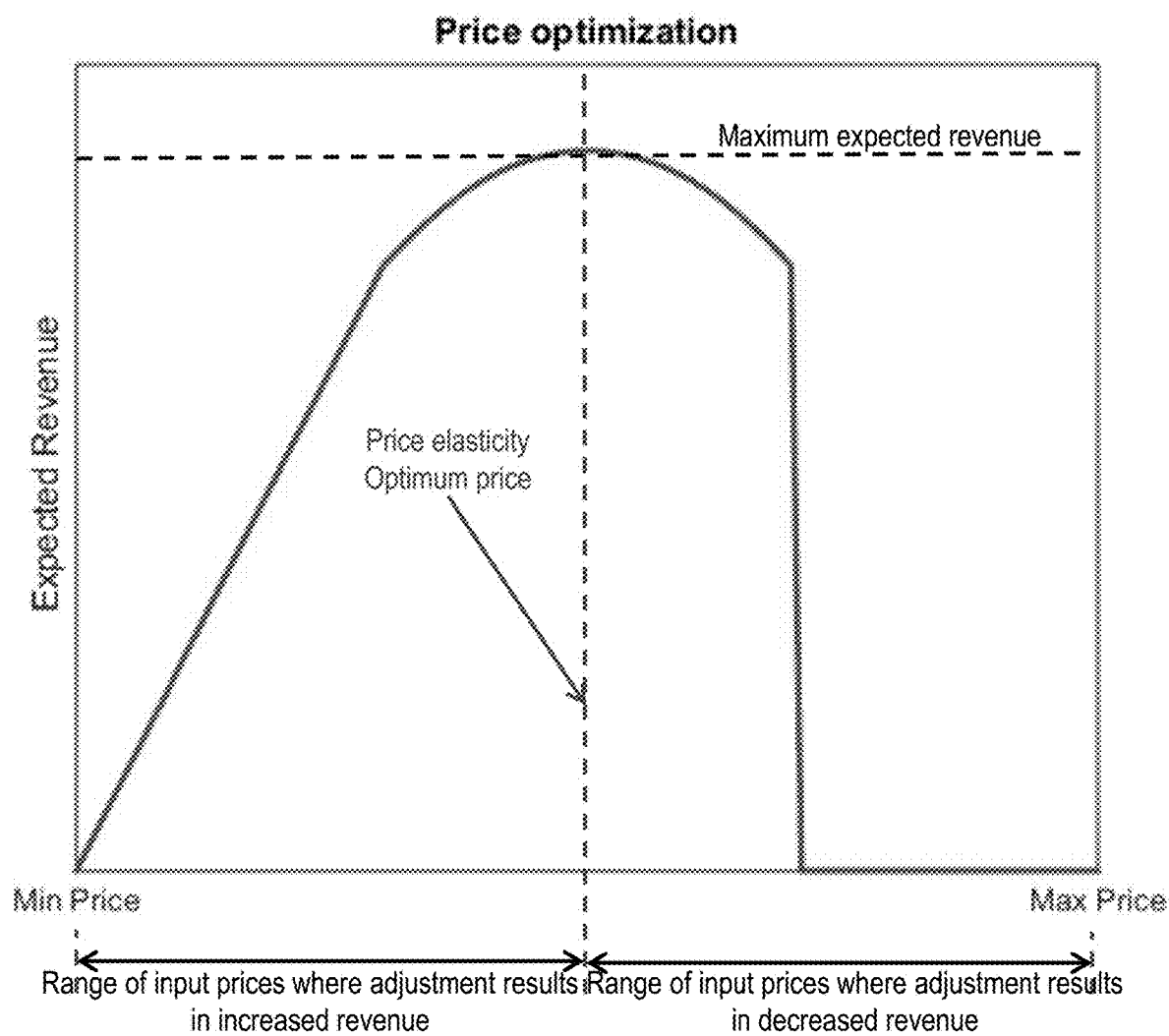
FIG. 18 is a graph of optimal price.

The expected revenue is calculated from the price curve. The price curve presents the probability that the customer is willing to pay for the service at a given price [price] vs. [acceptability]. The maximum likelihood revenue from the customer for a given price can be obtained with [price]*[acceptability]. The optimum price maximizes the maximum likelihood revenue. The optimum price can be found by numerical optimization, i.e. calculate [price]*[acceptability] for a set of prices and find the maximum of all of them. The optimization ensures that the revenue obtained by previous steps is not decreased after the optimization, with a minimum acceptable price (lower bound on price). Input price for this procedure represents an opportunity cost. If the price after this step is smaller than the input price, opportunity cost is not replaced by selling the service, so the customer should be offered the opportunity cost even if they may reject the price if it is too high. If possible, probabilities of customer rejecting the higher price (after step 458) and the probability of higher paying customer requesting a service at a later time can be compared and a more nuanced choice can be made. FIG. 18 illustrates an example optimal price curve.

Update Resource Price Category Limits

Figure 19:
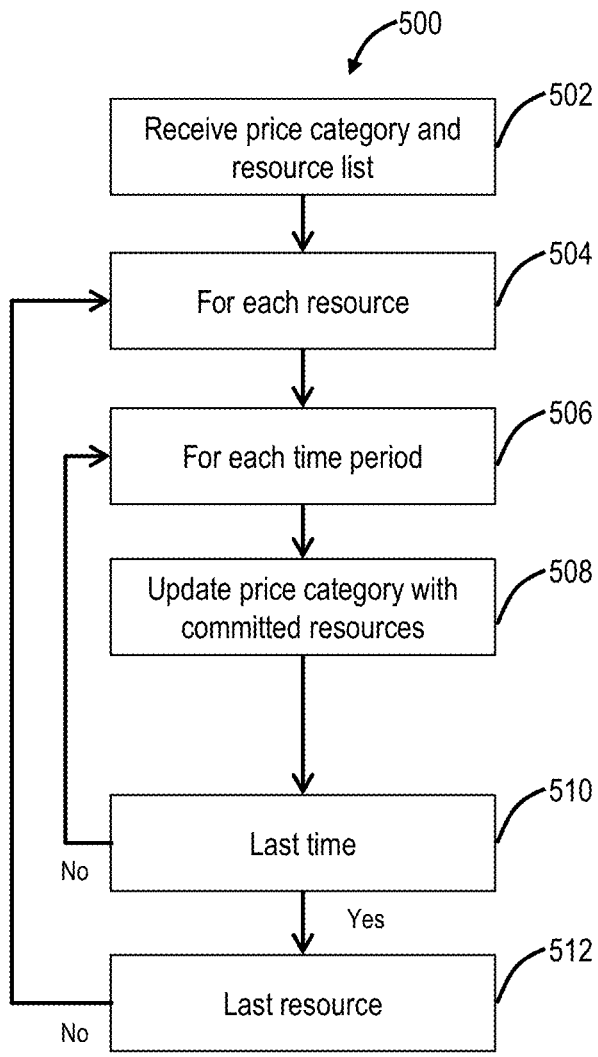
FIG. 19 is a flowchart of a process to update resource price category limits.

FIG. 19 is a flowchart of a process 500 to update available resources in price categories. The price category availability is updated if the service is accepted into the network. For each resource and time span, the amount of resources committed is used to update the price category limits. If the topology used includes multiple price categories, update the limit of the price most recently appended to the topology. Two possible update mechanisms are available, namely standard nesting (only update the selected category) or theft nesting (update the selected category and all lower categories). If resources are using multiple categories, each category is updated on each resource. In case of token based tracking of resources in each category, tokens corresponding to the price category are removed from the pool of tokens in the corresponding time span. The process 500 includes receiving a price category and resource list (step 502). For each resource (step 504) and for each time span (step 506), the process includes updating the price category with committed resources (step 508) until the last time period (step 510) and the last resource (step 512).

Example System Performance

Figure 20:
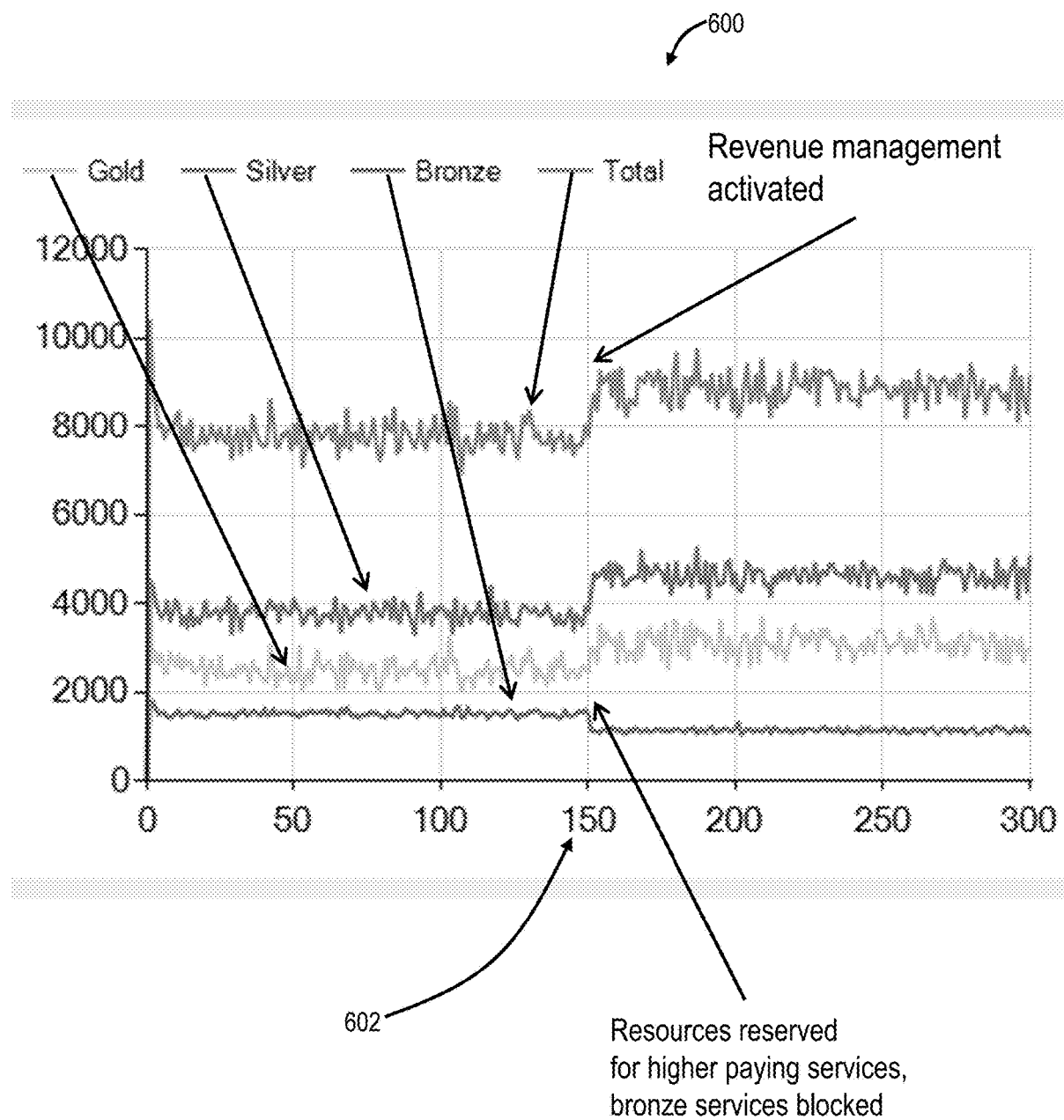
FIG. 20 is a graph of improvement in revenue using the systems and methods described herein.

FIG. 20 is a graph 600 illustrating improvement in revenue using the systems and methods described herein. As a proof of concept, the first step of the pricing procedure was implemented in a connection level simulation. FIG. 20 shows the results of running the algorithm on a 14 node network of an existing North American service provider. There are three types of price categories (from cheapest to most expensive: bronze, silver, gold) that request network resources. To compare the performance of revenue management, the simulator ran the admission control process with and without pricing mechanism. The graph 600 illustrates revenue (y-axis) versus time (x-axis) for each of the price categories as well as a total of all of the price categories. At a time 602, the admission control mechanism starts to use the pricing and resource management processes 250, 300, 350, 400 to limit the quantity of bronze (cheap) services into the network, based on the assumption that more expensive (gold and silver) services will start using the resources. The top line shows up to the moment aggregate revenue. It is shown that the revenue increased by about 15% since the network is now accepting more gold and silver paying services and the bronzes are blocked. Note that in the simulation, bronze paying services are blocked from using the network at the bronze price, they could indeed be accepted at the silver or gold price, e.g. using process 300, which was not tested in the simulator.

Service Request/Response Exchange

Figure 21:
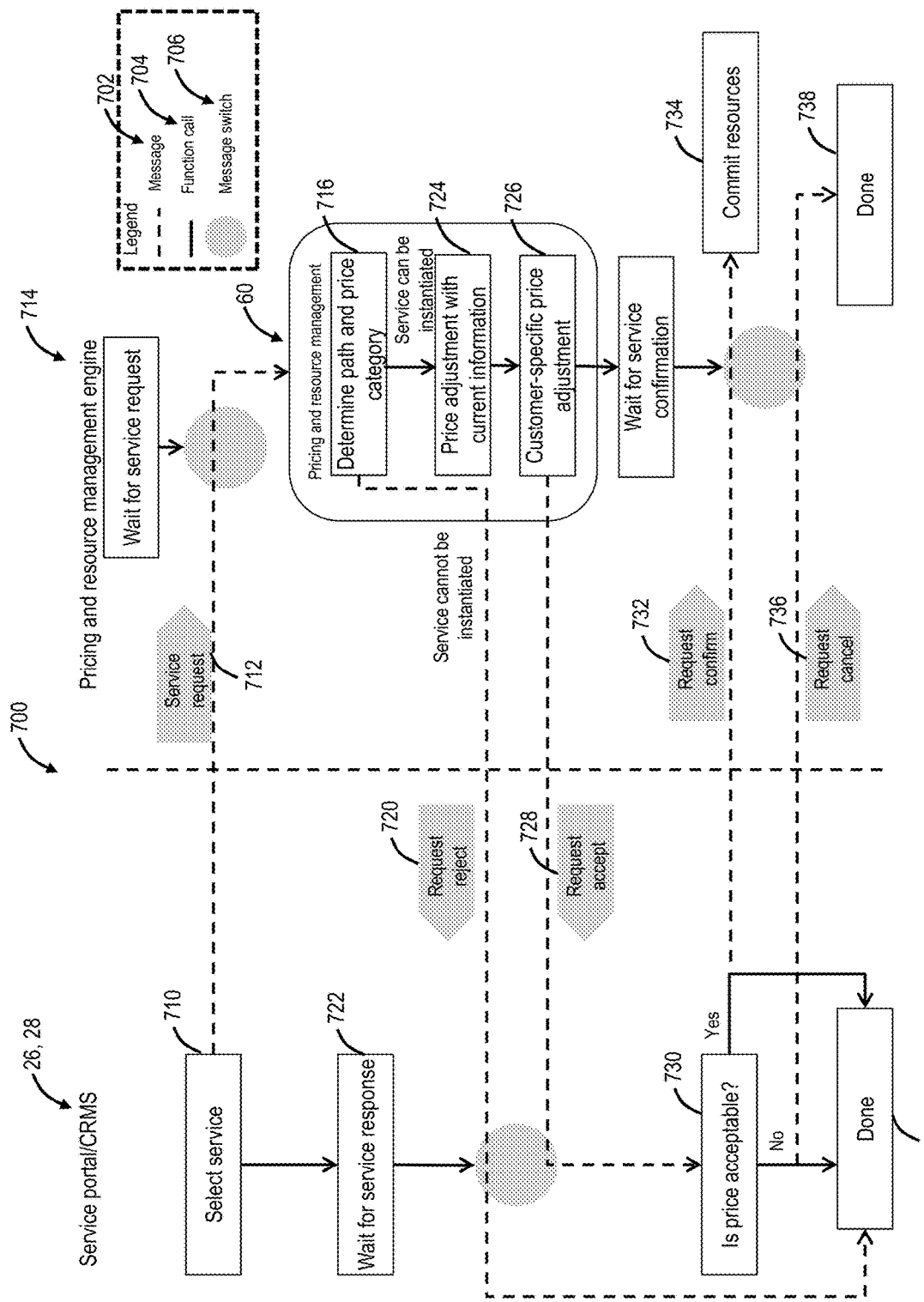
FIG. 21 is a flow diagram of a service request/response exchange using components in the network of FIG. 1.

FIG. 21 is a flow diagram of a service request/response exchange 700 using components in the network 10. Specifically, the service request/response exchange 700 illustrates functions performed by and between the service portal 26, the CRMS 28, and the pricing and resource management engine 60. For illustration purposes, the service portal 26 and the CRMS 28 are shown as a single component. The service request/response exchange 700 illustrates messages 702, function calls 704, and a message switch 706 for performing various functions. The messages 702 are transmitted between entities, for example, between the service portal 26 and the pricing and resource management engine 60, etc. The function calls 706 are internal messages, such as within the pricing and resource management engine 60. Finally, the message switch 706 signifies a switching/routing of the messages 702.

The service request/response exchange 700 begins with the selection of a service (step 710) which can be performed in the service portal 26, the CRMS 28, or the like. This is selecting a particular network service. In response, a service request message 712 is sent to the pricing and resource management engine 60, and the service request message 712 may optionally be queued in a message switch 706 to wait for processing by the pricing and resource management engine 60. In the pricing and resource management engine 60, the pricing and resource management engine 60 can include determining the path and price category (step 716) to instantiate the network service. If it is not possible to instantiate the network service, the service request/response exchange 700 is done (step 718) and this can be conveyed to the service portal 26, the CRMS 28, or the like through a request reject message 720. Note, while the pricing and resource management engine 60 is active, the service portal 26, the CRMS 28, or the like waits for a service response (step 722). If the service can be instantiated, the pricing and resource management engine 60 can perform price adjustment with current information (step 724) and customer-specific price adjustment (step 726). The pricing and resource management engine 60 can perform one of the pricing and resource management processes 150, 250, 300, 350, 400, 450.

After the step 726, the pricing and resource management engine 60 sends a request accept message 728 to the service portal 26, the CRMS 28, or the like for acceptance (step 730). At the service portal 26, the CRMS 28, or the like, the price is accepted or not (step 730) and the service request/response exchange 700 ends (step 718). If the price is accepted, a request confirm message 732 is sent to the network 10, the SDN control plane 20, the pricing and resource management engine 60, etc. such that resources for the network service can be committed (step 734). Otherwise, if the price is not accepted, a request cancel message 736 is sent to the pricing and resource management engine 60, and the service request/response exchange 700 ends (step 738).

Service Price Negotiation Exchange

Figure 22:
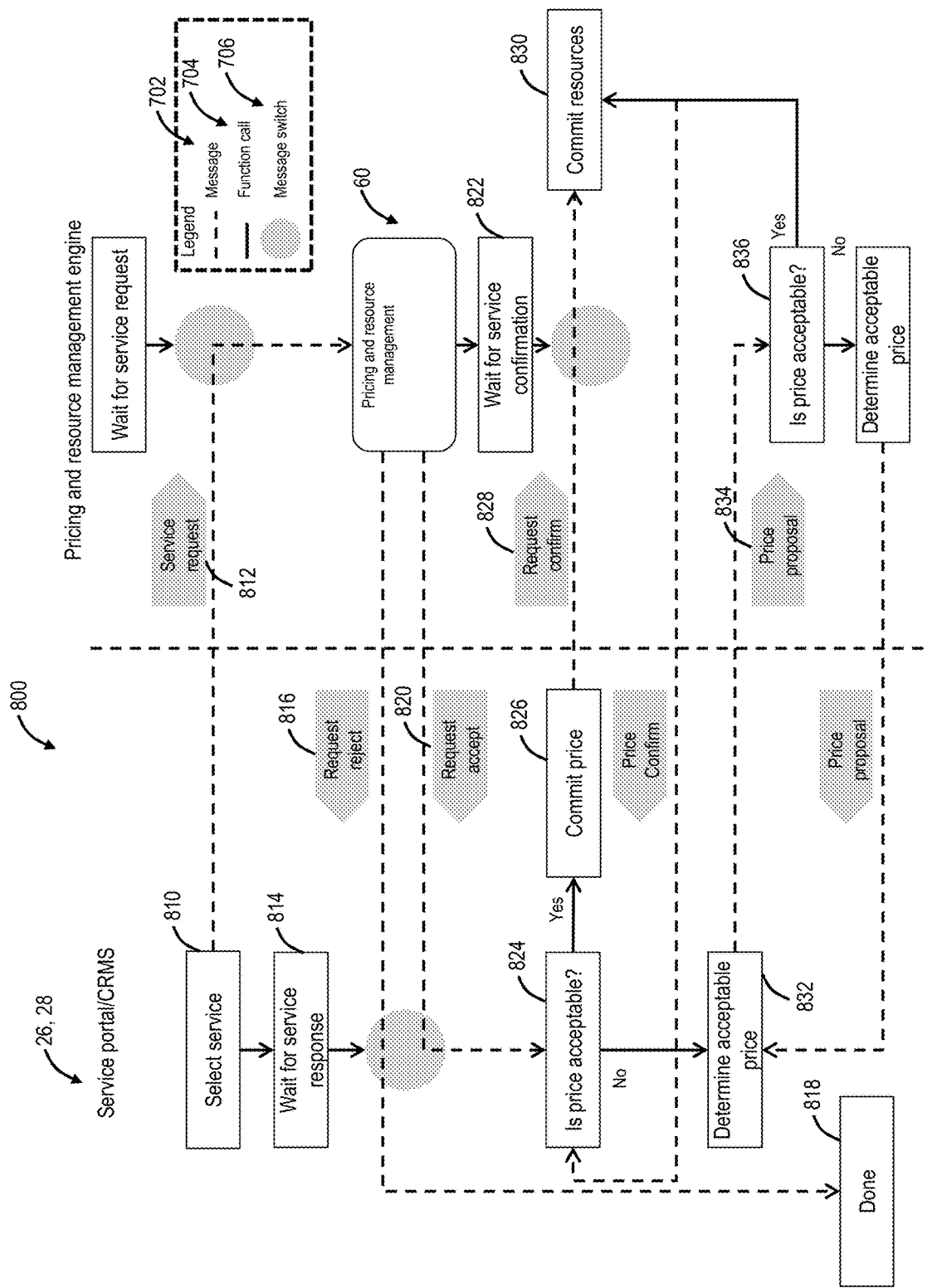
FIG. 22 is a flow diagram of a service price negotiation exchange using components in the network.

FIG. 22 is a flow diagram of a service price negotiation exchange 800 using components in the network 10. Similar to FIG. 21, the service price negotiation exchange 800 illustrates functions performed by and between the service portal 26, the CRMS 28, and the pricing and resource management engine 60. For illustration purposes, the service portal 26 and the CRMS 28 are shown as a single component. The service price negotiation exchange 800 illustrates a negotiation or back-and-forth for the pricing whereas the service request/response exchange 700 was a single step, i.e., offer and acceptance or rejection.

The service price negotiation exchange 800 begins with the selection of a service (step 810) which can be performed in the service portal 26, the CRMS 28, or the like. This is selecting a particular network service. In response, a service request message 812 is sent to the pricing and resource management engine 60, and the service request message 812 may optionally be queued in a message switch 706 to wait for processing by the pricing and resource management engine 60. The pricing and resource management engine 60 can perform one of the pricing and resource management processes 150, 250, 300, 350, 400, 450, in response to the service request message 812 while the service portal 26, the CRMS 28, or the like waits for a service response (step 814).

If the pricing and resource management engine 60 cannot instantiate the network service, a request reject message 816 is sent to the service portal 26, the CRMS 28, or the like and the service price negotiation exchange 800 ends (step 818). Otherwise, if the pricing and resource management engine 60 can instantiate the network service, a request accept message 820 is sent to the service portal 26, the CRMS 28, or the like and the pricing and resource management engine 60 waits for service confirmation (step 822). At the service portal 26, the CRMS 28, or the like, it is determined if the price is acceptable (step 824). If the price is acceptable, it is committed (step 826) and a request confirm message 828 is sent to the network 10, the SDN control plane 20, the pricing and resource management engine 60, etc. such that resources for the network service can be committed (step 830).

If the price is not accepted (step 824), a determination may occur at an acceptable price (step 832) such as a counter offer which is sent via a price proposal message 834 to the pricing and resource management engine 60 which can determine if the counter offer price is acceptable (step 836), and if so, commit the resources (step 830). If the counter offer price is not acceptable (step 836), the pricing and resource management engine 60 can determine another acceptable price (step 838) and send another price proposal message 840 to the service portal 26, the CRMS 28, or the like. This iterative process can continue until an acceptable price is determined, from both perspectives.

Content of Service Request Messages

A service request message 712, 812—sent to request a new service can include
    Price offer—the preferred price for the requestor
    Price limit—the most requestor is willing to pay for the service
    Service egress/ingress points (e.g. A-Z, or point-to-multipoint or multipoint-to-multipoint connectivity)
    Service time range (e.g. start and end times, start and end time ranges, immediate)
    Service duration
    Maximum latency
    Bandwidth
    List of data plane VNF features A service response message 728, 820—sent to confirm that a service can be instantiated, and price level can include
    Service price
    Service latency
    Service start time
    Service VNF features
    Unique service number A service confirm message 732, 828—sent to confirm acceptance of the service and the price can include a unique service number.

A service request message exchange may be accomplished in multiple ways:
    Messages may be sent over the network using a reliable protocol
    Messages may be sent over the network using an unreliable protocol (timers may be needed to avoid deadlocks)
    Messages may be sent using remote procedure calls
    Messages may be sent using local procedure calls The pricing and resource management processes 150, 250, 300, 350, 400 are novel. The current state of the art in revenue management is very specialized, so each algorithm is used only in one field, but no one field matches network services exactly or can be easily adapted. Airline industry algorithms only look at pricing networked resources for services which are effectively the same duration. The hotel industry, on the other hand, prices resources for different durations, but the resources are not networked. In either case the resources are essentially uniform (e.g. plane seats, or hotel rooms). In the pricing and resource management processes 150, 250, 300, 350, 400, the management includes networked resources for services with non-uniform durations. The resources themselves are also non-uniform (e.g. bandwidth, spectrum, compute and storage resources are all managed with this mechanism).

Although revenue management is an established science, the pricing and resource management processes 150, 250, 300, 350, 400 apply it specifically in the context of network services. For example, in the context of networking the product is a network services (compared to a room, or a fare) and resources are non-uniform (links with varying capacities or at different layers, and VNFs). The systems and methods take the concept of revenue management and adapt it to these new scenarios. Other aspects include methods to embed the pricing method into several possible service negotiation methods working with the SDN-based PCE architectures.

In various embodiments, a method for pricing of network services and network resource management includes categorizing a service request into one of several price categories, selecting resources with sufficient availability in the price category to enable the network service, determining a price for a service from price category and its occupancy, and updating the availability of resources in price category if the service is instantiated. The network service may have connectivity, latency, bandwidth, duration, start-time, and data plane requirements, the resources may be link bandwidth, network element ports, light spectrum, wireless spectrum, compute and storage, VNF licenses, and resources may be time shared with a scheduler. The price can be further adjusted with customer-specific information. The resources can be updated with theft nesting or standard nesting. The resources can be used over several time periods with different base prices and the price category price information can be calculated from base prices.

The resources can be selected by first pruning resources with insufficient availability in price category from the network topology, and the request is routed on pruned topology. The resources can be selected by first pruning resources with insufficient availability in price category from the network topology, then pruning resources without time availability, and then the request is routed on pruned topology. The calculated price can be used in network service negotiation. Additional price categories can be considered by for example moving the service to a higher price category, or by appending the links of lower level price categories. The pricing limits can be one-dimensional and available for different times, or can be implemented as two-dimensional tokens.

SDN Environment

Figure 23:
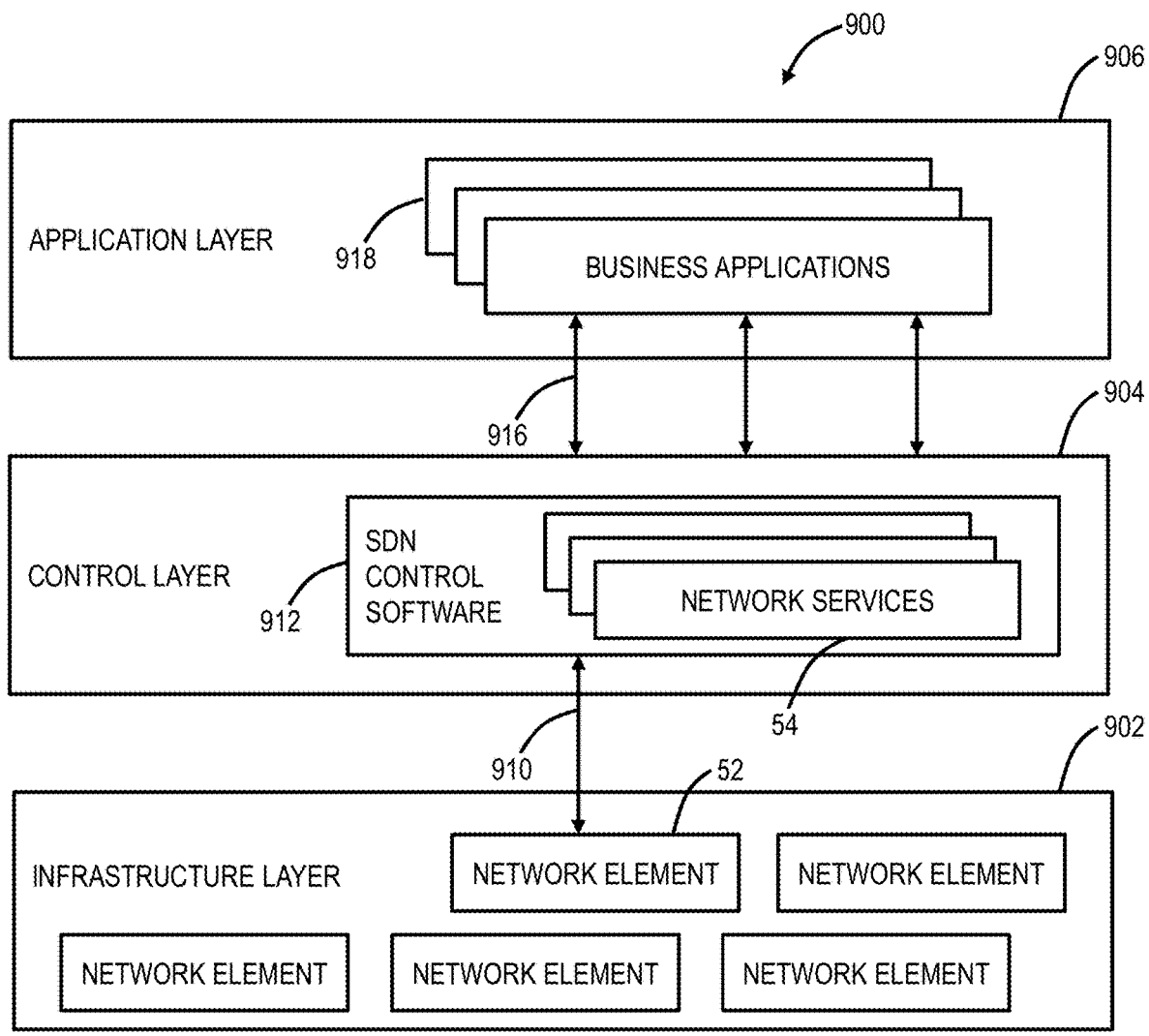
FIG. 23 is a block diagram of functional/logical components of an SDN environment, for implementing the systems and methods for network service pricing and resource management.

Referring to FIG. 23, in an embodiment, a block diagram illustrates functional/logical components of an SDN environment 900, for implementing the systems and methods for network service pricing and resource management. The SDN environment 900 includes a programmable infrastructure layer 902, a control layer 904, and an application layer 906. The programmable infrastructure layer 902 includes network devices such as the network elements 52, and other components in the network 10 and is communicatively coupled to the control layer 904 via a control plane interface 110 such as OpenFlow, for example, or any other SDN protocol. The control layer 904 facilitates communication between the application layer 906 and the network elements 52 located in the programmable infrastructure layer 902. The control layer 904 includes SDN control software 912 which control a plurality of network services 54, such as with the pricing and resource management processes 150, 250, 350, 400. The control layer 904 provides SDN functionality to manage network services through the abstraction of lower level functionality. For example, the SDN control plane 20 can be implemented in full or in part through the control layer 904. The application layer 906 communicates with the control layer 904 through various Application Programming Interfaces (APIs) 916. The application layer 906 provides end user connectivity to the SDN such as software modules and/or functions responsible for creating desired path and flow connections on the physical network through various business applications 918. In various embodiments, components in the network 10, the SDN control plane 20, and the pricing and resource management engine 60 can be implemented in the control layer 904, in the application layer 906, as one of the business applications 918, etc. For example, the pricing and resource management engine 60 can be one or more of the business applications 918. The portals 24, 26 can be controlled and managed through a business application 918, etc.

Server

Figure 24:
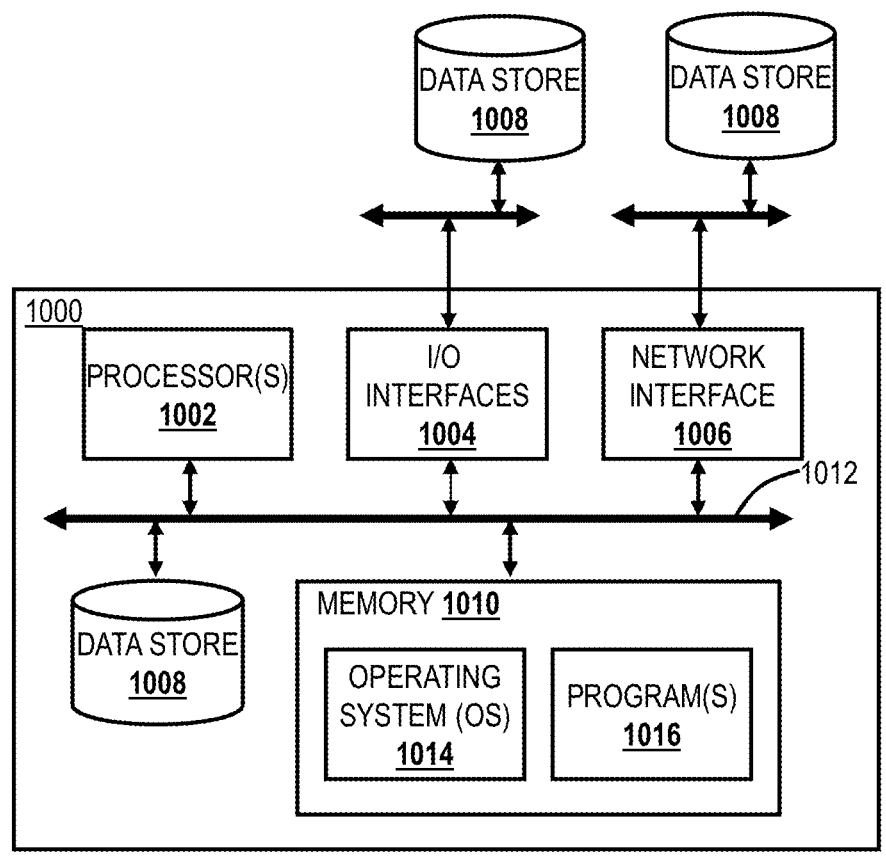
FIG. 24 is a block diagram of a server such as for the implementing various components of the systems and methods for network service pricing and resource management, and the various processes described herein.

Referring to FIG. 24, in an embodiment, a block diagram illustrates a server 1000 such as for the implementing various components of the systems and methods for network service pricing and resource management, and the various processes described herein. The server 1000 can be a digital computer that, in terms of hardware architecture, generally includes a processor 1002, input/output (I/O) interfaces 1004, a network interface 1006, a data store 1008, and memory 1010. It should be appreciated by those of ordinary skill in the art that FIG. 24 depicts the server 1000 in an oversimplified manner, and a practical embodiment may include additional components and suitably configured processing logic to support known or conventional operating features that are not described in detail herein. The components (1002, 1004, 1006, 1008, and 1010) are communicatively coupled via a local interface 1012. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 can include address, control, and/or data connections to enable appropriate communications among the components above.

The processor 1002 is a hardware device for executing software instructions. The processor 1002 can be any custom made or commercially available processor, a central processing unit (CPU), graphics processing units (GPUs), an auxiliary processor among several processors associated with the server 1000, a semiconductor based microprocessor (in the form of a microchip or chip set), or generally any device for executing software instructions. When the server 1000 is in operation, the processor 1002 is configured to execute software (i.e., instructions) stored in the memory 1010, to communicate data to and from the memory 1010, and to generally control operations of the server 1000 pursuant to the software instructions. The I/O interfaces 1004 can be used to receive user input from and/or for providing system output to one or more devices or components. User input can be provided via, for example, a keyboard, touchpad, and/or a mouse. System output can be provided via a display device and a printer (not shown). I/O interfaces 1004 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 1006 can be used to enable the server 1000 to communicate on a network. The network interface 1006 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 1006 can include address, control, and/or data connections to enable appropriate communications on the network. A data store 1008 can be used to store data. The data store 1008 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 can incorporate electronic, magnetic, optical, and/or other types of storage media. In one example, the data store 1008 can be located internal to the server 1000 such as, for example, an internal hard drive connected to the local interface 1012 in the server 1000. Additionally in another embodiment, the data store 1008 can be located external to the server 1000 such as, for example, an external hard drive connected to the I/O interfaces 1004 (e.g., SCSI or USB connection). In a further embodiment, the data store 1008 can be connected to the server 1000 through a network, such as, for example, a network-attached file server.

The memory 1010 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1010 can incorporate electronic, magnetic, optical, and/or other types of storage media. Note that the memory 1010 can have a distributed architecture, where various components are situated remotely from one another, but can be accessed by the processor 1002. The software in memory 1010 can include one or more software programs, each of which includes an ordered listing of executable instructions for implementing logical functions, based on execution by the processor 1002. The software in the memory 1010 includes a suitable operating system (O/S) 1014 and one or more programs 1016. The operating system 1014 essentially controls the execution of other computer programs, such as the one or more programs 1016, and provides scheduling, input-output control, file and data management, memory management, and communication control and related services. The one or more programs 1016 may be configured to implement the various processes, algorithms, methods, techniques, etc. described herein.

In an embodiment, in the network 10, the SDN control plane 20 can be implemented by an SDN controller formed through one or more servers. The pricing and resource management engine 60 can be implemented in the server 200 which is communicatively coupled to the SDN controller, operating as one of the business applications 918. Here, the server 200 is configured to implement the pricing and resource management processes 150, 250, 350, 400 based on communication with the network 10 and the SDN control plane 20.

In an embodiment, the server 1000 is an apparatus configured to provide network service pricing and service resource management for a Software Defined Networking (SDN) network. The apparatus includes a network interface communicatively coupled to a network configured to provide the network service; a processor communicatively coupled to the network interface; and memory storing instructions that, when executed, causes the processor to receive a service request for a network service in the SDN network, determine one or more price categories and network resources for the service request, wherein the network resources are selected to instantiate the network service, adjust a price of the network resources by modifying the one or more price categories based on current and known future network information of the SDN network, and, responsive to acceptance of the price, cause instantiation of the network service through the network resources in the SDN network.

The network service can be one of a point-to-point, point-to-multipoint, multipoint-to-multipoint connection, and Virtual Private Network, which has an associated Service Level Agreement (SLA) committing the SDN network to support a Quality-of-Service (QoS). The network resources can be one or more of link bandwidth at Layer 0, 1, 2, and/or 3, network element ports, wavelengths, wireless spectrum, compute and storage resources, and Virtual Network Functions (VNF) resources. The memory storing instructions that, when executed, can further cause the processor to adjust the price of the network resources based on customer-specific information related to a customer's willingness to pay for the network service using a price elasticity curve. The memory storing instructions that, when executed, can further cause the processor to, responsive to acceptance of the price, update the one or more price categories and availability of the network resources. The memory storing instructions that, when executed, can further cause the processor to determine an initial price category of the one or more price categories; prune insufficient resources in the initial price category to determine a first pruned topology; and determine a path through the SDN network on the first pruned topology.

The memory storing instructions that, when executed, can further cause the processor to, if no path is determined on the pruned topology, select another price category of the one or more price categories; prune insufficient resources in the another price category to determine a second pruned topology; and determine a path through the SDN network on the second pruned topology. The apparatus can be configured to execute an SDN business application providing a pricing and resource management engine and to determine a path through the SDN network by a Path Computation Element (PCE). The service request can be received from a service portal or a Customer Relationship Management (CRM) system, and the apparatus can be configured to execute an SDN business application providing a pricing and resource management engine.

It will be appreciated that some embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the approaches above may be used. Moreover, some embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for instantiating a network service in a network, the method comprising:
receiving a service request for the network service;
determining network resources in the network to instantiate the network service;
approximating opportunity cost of the network service, wherein the opportunity cost reflects cost of the network service where the network resources are assigned to another higher paying service;
determining a price for the network resources based on the approximated opportunity cost of the network service and utilizing forecasts with adjustments to the price based on a current network status relative to the forecasts;
providing the price in response to the service request; and
responsive to acceptance of the price, causing instantiation of the network service through the network resources in the network.

2. The method of claim 1, wherein the adjustments to the price based on a current network status comprise adjusting the lowest price category based on changes to the forecasts.

3. The method of claim 1, wherein the price is further adjusted based on price elasticity obtained from previous responses from an associated user.

4. The method of claim 1, further comprising:
responsive to rejection of the price, receiving a price proposal; and
responsive to acceptance of the price proposal, causing the instantiation of the network service through the network resources in the network.

5. The method of claim 1, wherein the network service is one of a point-to-point, point-to-multipoint, multipoint-to-multipoint connection, and Virtual Private Network, which has an associated Service Level Agreement (SLA) committing the network to support a Quality-of-Service (QoS).

6. The method of claim 1, wherein the network resources are one or more of link bandwidth at Layer 0, 1, 2, and/or 3, network element ports, wavelengths, wireless spectrum, compute and storage resources, and Virtual Network Functions (VNF) resources.

7. The method of claim 1, wherein the service request is received through one of a service portal, a Customer Relationship Management (CRM) system, and an Application Programming Interface (API), and wherein the method is performed by a pricing and resource management engine executed on a server communicatively coupled to the network.

8. A system configured to instantiate a network service in a network, the system comprising:
a network interface communicatively coupled to a network configured to provide the network service;
a processor communicatively coupled to the network interface; and
memory storing instructions that, when executed, causes the processor to receive a service request for the network service,
determine network resources in the network to instantiate the network service,
approximate opportunity cost of the network service, wherein the opportunity cost reflects cost of the network service where the network resources are assigned to another higher paying service,
determine a price for the network resources based on the approximated opportunity cost of the network service and utilizing forecasts with adjustments to the price based on a current network status relative to the forecasts,
provide the price in response to the service request, and
responsive to acceptance of the price, cause instantiation of the network service through the network resources in the network.

9. The system of claim 8, wherein the adjustments to the price based on a current network status comprise adjusting the lowest price category based on changes to the forecasts.

10. The system of claim 8, wherein the price is further adjusted based on price elasticity obtained from previous responses from an associated user.

11. The system of claim 8, wherein the memory storing instructions that, when executed, further causes the processor to
responsive to rejection of the price, receive a price proposal, and
responsive to acceptance of the price proposal, cause the instantiation of the network service through the network resources in the network.

12. The system of claim 8, wherein the network service is one of a point-to-point, point-to-multipoint, multipoint-to-multipoint connection, and Virtual Private Network, which has an associated Service Level Agreement (SLA) committing the network to support a Quality-of-Service (QoS).

13. The system of claim 8, wherein the network resources are one or more of link bandwidth at Layer 0, 1, 2, and/or 3, network element ports, wavelengths, wireless spectrum, compute and storage resources, and Virtual Network Functions (VNF) resources.

14. The system of claim 8, wherein the service request is received through one of a service portal, a Customer Relationship Management (CRM) system, and an Application Programming Interface (API), and wherein the method is performed by a pricing and resource management engine executed on a server communicatively coupled to the network.

15. A non-transitory computer-readable medium comprising instructions for a Software Defined Networking (SDN) application that, when executed, cause a processor to perform the steps of:
receiving a service request for a network service;
determining network resources in the network to instantiate the network service;
approximating opportunity cost of the network service, wherein the opportunity cost reflects cost of the network service where the network resources are assigned to another higher paying service;
determining a price for the network resources based on the approximated opportunity cost of the network service and utilizing forecasts with adjustments to the price based on a current network status relative to the forecasts;
providing the price in response to the service request; and
responsive to acceptance of the price, causing instantiation of the network service through the network resources in the network.

16. The non-transitory computer-readable medium of claim 15, wherein the price is further adjusted based on price elasticity obtained from previous responses from an associated user.

17. The non-transitory computer-readable medium of claim 15, wherein the steps further comprise:
   responsive to rejection of the price, receiving a price proposal; and
responsive to acceptance of the price proposal, causing the instantiation of the network service through the network resources in the network.

* * * * *